(12) United States Patent
Kawase

(10) Patent No.: US 7,239,364 B2
(45) Date of Patent: Jul. 3, 2007

(54) DISPLAY SUBSTRATE HAVING NON-UNIFORM REFLECTIVITY IN A HIGH TRANSMITTANCE REGION AND NON-UNIFORM REFLECTIVITY IN A HIGH REFLECTIVITY REGION, LIQUID CRYSTAL DEVICE USING DISPLAY SUBSTRATE, ELECTRONIC APPLIANCES COMPRISING LIQUID CRYSTAL DEVICE, AND METHOD OF MANUFACTURING THEREOF

(75) Inventor: Tomomi Kawase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/314,265

(22) Filed: Dec. 9, 2002

(65) Prior Publication Data

US 2003/0123002 A1    Jul. 3, 2003

(30) Foreign Application Priority Data

Dec. 27, 2001    (JP) ............................. 2001-398538

(51) Int. Cl.
*G02F 1/1335* (2006.01)
(52) U.S. Cl. ...................................... 349/114; 349/113
(58) Field of Classification Search ................ 349/113, 349/114, 106
See application file for complete search history.

(56) References Cited

U.S. PATENT DOCUMENTS

| 5,753,937 | A | 5/1998 | Shimomaki et al. |
| 6,366,333 | B1 * | 4/2002 | Yamamoto et al. ......... 349/113 |
| 6,380,995 | B1 * | 4/2002 | Kim ............................ 349/113 |
| 6,476,888 | B2 * | 11/2002 | Yamanashi .................. 349/106 |
| 6,593,981 | B1 * | 7/2003 | Haim et al. .................. 349/106 |
| 6,825,902 | B2 * | 11/2004 | Kaneko ....................... 349/114 |

FOREIGN PATENT DOCUMENTS

| JP | 07-318929 | 12/1995 |
| JP | 07-333598 | 12/1995 |
| JP | A-10-10528 | 1/1998 |
| JP | A 11-209669 | 8/1999 |
| JP | A-11-242105 | 9/1999 |
| JP | A-2000-147502 | 5/2000 |
| JP | A-2000-250027 | 9/2000 |
| JP | A-2001-125094 | 5/2001 |

* cited by examiner

*Primary Examiner*—Andrew Schechter
*Assistant Examiner*—Richard H Kim
(74) *Attorney, Agent, or Firm*—Oliff & Berridge, PLC

(57) ABSTRACT

The invention enables color characteristics to always be enhanced in both reflection mode display and transmission mode display in the transreflective type liquid crystal device. The present invention provides a liquid crystal device including a color filter formed on one substrate of a pair of substrates with interposition of a liquid crystal. The color filter includes a dividing material 14 to divide the surface of the substrate into plural regions, a reflection layer formed in each region, a color pixel and a protective layer formed on the reflection layer. The thickness of the reflection layer is significantly different within the divided region, and a high transmission region having a transmittance of 50% or less is formed in the reflection layer formed to be thinner than the reference thickness. When the color pixel is formed with a thick film corresponding to the high transmission region, a bright display becomes possible in the reflection mode display, and a transreflective type liquid crystal device is obtained with enhanced color characteristics in both transmission mode display and reflection mode display.

7 Claims, 21 Drawing Sheets

DISPLAY SUBSTRATE HAVING NON-UNIFORM REFLECTIVITY IN A HIGH TRANSMITTANCE REGION AND NON-UNIFORM REFLECTIVITY IN A HIGH REFLECTIVITY REGION, LIQUID CRYSTAL DEVICE USING DISPLAY SUBSTRATE, ELECTRONIC APPLIANCES COMPRISING LIQUID CRYSTAL DEVICE, AND METHOD OF MANUFACTURING THEREOF

BACKGROUND OF THE INVENTION

1. Field of Invention

The present invention relates to a substrate employed in a display. In particular, the present invention relates to a liquid crystal device, an electronic appliance using the substrate, and a method for manufacturing thereof.

2. Description of Related Art

Liquid crystal devices have recently been used for electronic appliances, such as cellular phones and portable type personal computers. A related art liquid crystal device includes a so-called reflection type display mode liquid crystal device that includes a light reflection layer (reflection layer) disposed on the inner or outer surface of a substrate that is disposed opposite to the observation side relative to the liquid crystal layer. An incident light from the observation side is reflected by the reflection layer, and the reflected light is utilized as a display light source. Another related art device is a so-called transmission display mode liquid crystal device in which an illumination device, or a so-called back-light, is disposed at the opposed side to the observation side relative to the liquid crystal layer. The illumination device is used as a display light source. Another related art liquid crystal device is a so-called transreflective display mode liquid crystal device in which the display mode can be appropriately switched from the transmittance mode display to the reflection mode display, or vice versa, by providing a half mirror having both light reflection characteristics and light transmission characteristics as a light reflection layer (reflection layer). The liquid crystal device has recently been used for color display, on the other hand, by providing color pixels such as R (red), green (G), B (blue) pixels, or C (cyan), M (magenta) or Y (yellow) pixels, in the display region of the liquid crystal device.

SUMMARY OF THE INVENTION

However, good color display in both transmission mode display and reflection mode display has been impossible since an enhancement of reflection mode display characteristics results in thin colors of the transmission mode display, while an enhancement of transmission mode display characteristics results in deep colors of the reflection mode display in the display region, when the transreflective mode display is used by providing a half mirror having both the light reflection characteristics and light transmission characteristics for the reflection layer for color display using the color pixels. The inventors found that, through various experiments to elucidate the causes, a uniform color display is impossible unless the relations of the position and shape among the R, G and B color pixels match the distribution of light transmittance on the reflection layer. It was also found that forming the reflection layer by an ink-jet method is effective to change the thickness of the layer in order to change the light transmittance of the reflection layer in the divided region. The present invention takes the above discoveries into account, and provides a method for enabling good planar color display for both the reflection mode display and transmission mode display in a liquid crystal device, particularly in a transreflective mode liquid crystal device.

The present invention provides a display substrate including a pair of electrodes facing each other. A dot is formed in each region in which a pair of the electrodes are facing each other. A reflection layer is disposed corresponding to the dot, and reflectivity of the reflection layer is not uniform in each dot. The present invention also provides a display substrate including a pair of electrodes facing each other. A dot is formed in each region in which a pair of the electrodes are facing. A reflection layer is disposed corresponding to the dots, and the thickness of the reflection layer is not uniform in each dot.

Preferably, the reflection layer provided corresponding to the dot includes a region having a transmittance of 50% or more and a region having a reflectivity of 50% or more.

Color pixels are disposed corresponding to each dot, and the transmittance of the color pixel is preferably not uniform in the dot, or the thickness of the color pixel is preferably not uniform in the dot.

Preferably, the area having the transmittance of 50% or more accounts for 5% or more and 45% or less of the dot area.

The dot may be divided by dividing members, and one of the regions having transmittance of 50% or more and reflectivity of 50% or more is preferably disposed at one of the portion of either the central portion or peripheral portion of the region divided by the dividing member, and the other region is preferably disposed at the other portion of either the central portion or peripheral portion.

Since a high transmission region of a reflection layer having a light transmittance of 50% or more is formed corresponding to the portion of a color pixel having a maximum thickness in the present invention, a color is displayed by a light passing back and forth through a region other than the portion of the color pixel having the maximum thickness in the reflection mode display, while the color is displayed by a light passing through the portion of the color pixel having the maximum thickness in the transmission mode display.

Since the color is displayed by one passage of the light through the portion of the color pixel having the maximum thickness in the transmission mode display, and the color is displayed by back and forth passage of the light, or by two times of passage of the light through the thin portion of the layer in reflection mode display, the optical thickness in the reflection mode display may be equal or close to the optical thickness in the transmission mode display, enabling a uniform display between the two color display modes.

The dividing member is formed into a layer having a uniform thickness with an ink repelling resin using, for example, a related art layer deposition method, such as a spin-coat method, and a predetermined pattern is formed thereafter by a related art patterning method, such as a photolithographic method. The reflection layer is formed in each region divided with the dividing member using, for example, an ink-jet method, or by discharging the ink, or the reflection layer material, as droplets from the nozzle of the head. The color pixel is formed in each region divided by the dividing member using the ink-jet method, or by discharging an ink, or a material of the color pixel, as droplets from the nozzle of the head.

The reflection layer is formed in each region divided with the dividing member using, for example, the ink-jet method, or by discharging the ink, or the reflection layer material, as droplets from the nozzle of the head.

However, the thickness of the reflection layer is not always uniform in the plane when the reflection layer is formed by supplying the ink, or a half mirror material having both light reflection characteristics and light transmission characteristics, in the divided region based on the ink-jet method. For example, the reflection layer may be formed by being swelled as a hill or dome.

It is desirable to form the color pixel to have a larger thickness at the portion where the thickness of the reflection layer is smaller than the standard thickness, when the reflection layer is unevenly formed in the plane, in order to make reflection mode color display and transmission mode color display to be more uniform with each other.

It is effective to observe the shape of the high light transmission area provided on the reflection layer to determine the shape by taking advantage of optical interference patterns. Practically, the reflection light from the reflection layer is photographed with a camera by irradiating the reflection layer with a natural light. Then, the interference patterns are confirmed depending on the difference of the light reflectivity on the reflection layer. These interference patterns are considered to represent contour lines. Accordingly, a color filter precisely matching the magnitude of the light transmittance can be formed by selecting a desirable one of the interference patterns and by properly changing the thickness of the color pixel so as to fit the selected interference pattern.

The area of the high light transmission region is desirably 5% or more and 45% or less, more desirably around 30%, of the dot area. This is because good recognition of vision can be obtained in both the reflection mode display and transmittance mode display. Display becomes not clear due to insufficient amount of reflection light when the area ratio of the high light transmittance region is higher than the upper limit above, while display also becomes not clear due to insufficient illumination effect from the illumination device when the area ratio of the high transmittance region is lower than the lower limit above.

The color pixel is preferably formed into a shape corresponding to the thickness of the reflection layer.

The color density as observed on the color display is strongly affected by the thickness of the color pixel. Accordingly, it is highly probable that the density of the displayed color becomes uneven when the color pixel is formed irrelevant to the permeability of the reflection layer. Since transmittance of the reflection layer tends to be higher when the thickness of the reflection layer is smaller, a uniform color display may be achieved by determining the thickness of the color pixel relative to the thickness of the reflection layer.

The shape of the reflection layer that can be employed may have a cross-section that is depressed or swelled at the center. The present invention provides a liquid crystal device including a pair of substrates facing each other with interposition of a liquid crystal substance between a pair of the substrates. The display substrate as described above may be used as at least one of the substrate of a pair of the substrates.

An electronic appliance according to the present invention may mount the liquid crystal device as described above as a display member.

The present invention provides a method for manufacturing a display substrate including a pair of electrodes facing each other. A dot is formed in each region in which a pair of the electrodes are facing each other. The method includes allowing one of a nozzle and the substrate to move relative to the other while discharging a reflection layer material from the nozzle and allowing the reflection layer material to hit the substrate.

The reflection layer material may be discharged so that the thickness of the reflection layer formed becomes non-uniform in the dot.

Preferably, the reflection layer material includes a solvent, a solution containing metals and a permeable resin.

Preferably, a solution including Ag, Al and Cr, or an alloy containing these metals is used as the solution containing the metals, and the solvent having a boiling point of 80° C. or more is used as the solvent.

The method for manufacturing the display substrate as described above preferably includes allowing one of a nozzle and the substrate to move relative to the other while discharging a reflection layer material from the nozzle and allowing the reflection layer material to hit the substrate.

The material of the color pixel may be discharged so that the thickness of the color pixel formed becomes non-uniform in the dot.

The present invention also provides a method for manufacturing a liquid crystal device that includes a pair of substrates disposed in opposed relation with each other with interposition of a liquid crystal substance between a pair of the substrates. The method may include the method for manufacturing the display substrate as described above.

BRIEF DESCRIPTION OF THE DRAWINGS

FIG. 5(a) is a cross-sectional view in the transverse direction, FIG. 5(b) is a plan view, and FIG. 5(c) is a cross-sectional view in the longitudinal direction of a divided region;

FIG. 6(a) shows one example of the interference pattern measuring system, and FIG. 6(b) shows an illustrative interference pattern obtained by the system;

FIG. 14(a) is a partially broken perspective view, and FIG. 14(b) is a cross-sectional view taken along place J-J in FIG. 14(a);

FIG. 20(a) is a cross-sectional view in the transverse, FIG. 20(b) is a plan view, and FIG. 20(c) is a cross-sectional view in the longitudinal direction of the divided region;

DETAILED DESCRIPTION OF PREFERRED EMBODIMENTS

Embodiments

First Embodiment of the Liquid Crystal Device

Figure 1:
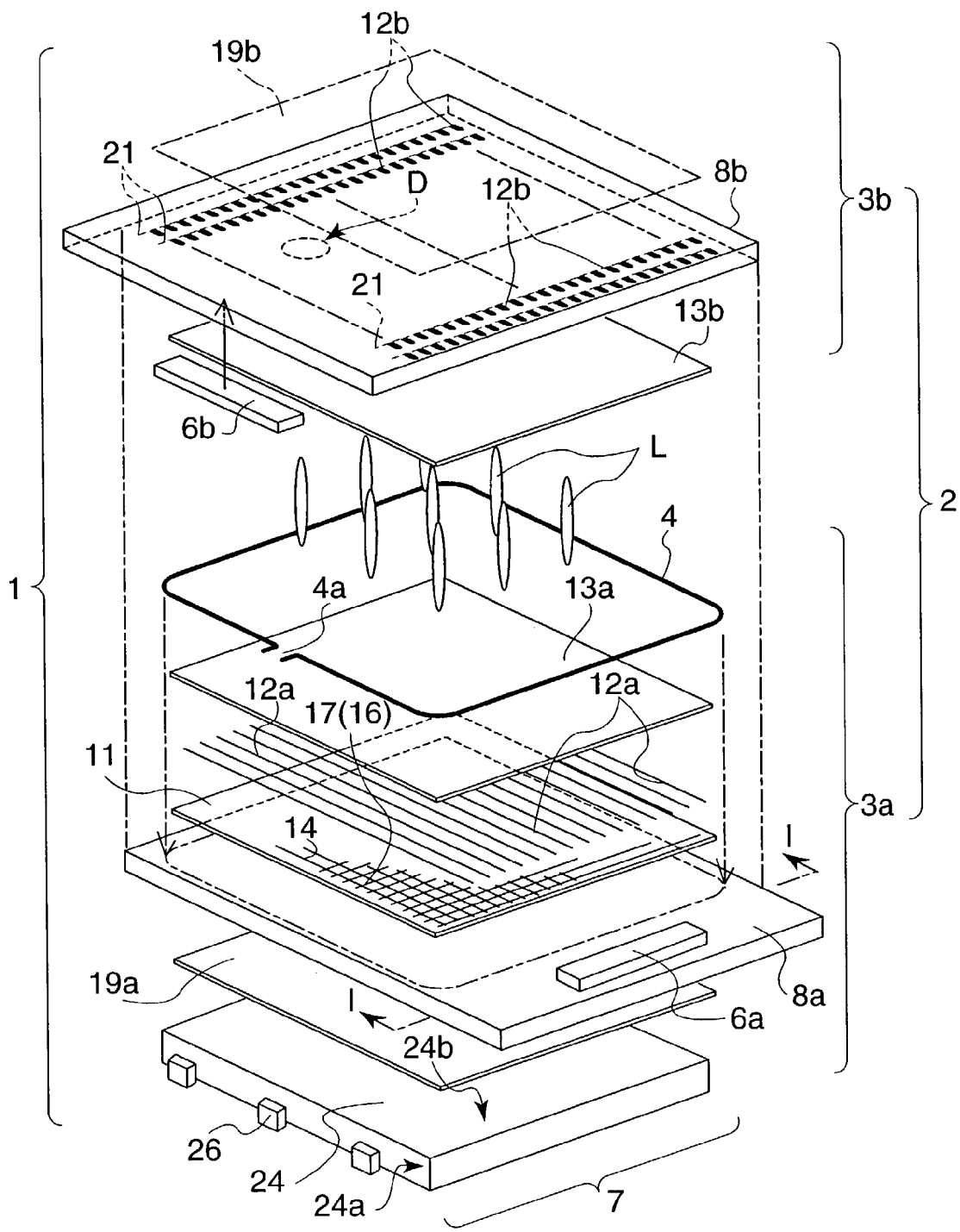
FIG. 1 is an exploded perspective view of the liquid crystal device according to the present invention.
Figure 2:
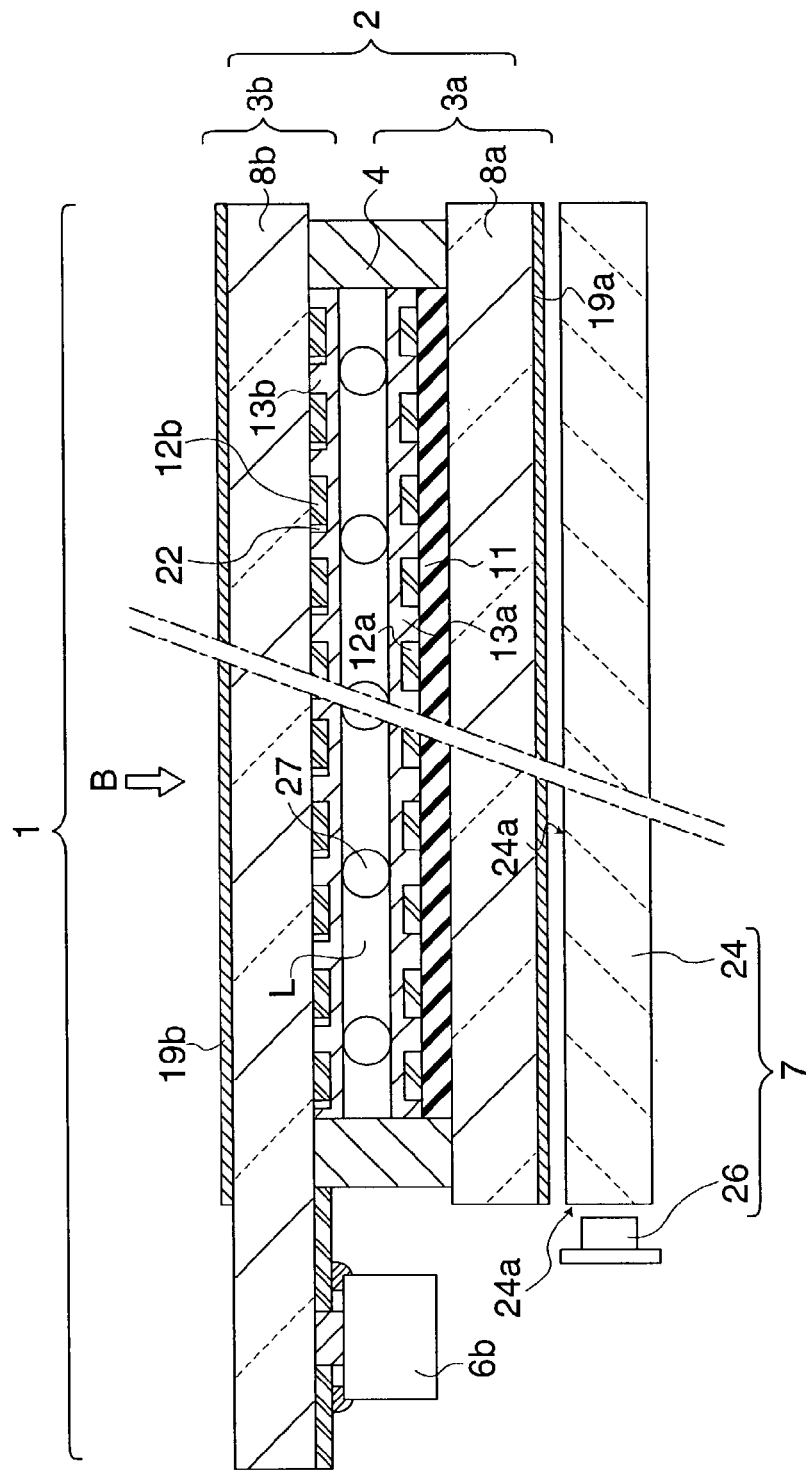
FIG. 2 is a cross-sectional view of the liquid crystal device taken along plane I-I in FIG. 1.

The first embodiment of the present invention is described below with reference to the embodiment. FIG. 1 shows a disassembled liquid crystal device according to one embodiment of the present invention. FIG. 2 is a cross-sectional view of the liquid crystal device taken along plane I-I in FIG. 1. The liquid crystal device 1 shown in the embodiment is an active matrix type liquid crystal device taking advantage of a TFD (Thin Film Diode) element that is a two-terminal type switching element as an active element. The liquid crystal device is also a transreflective mode liquid crystal device having both functions of a reflection mode display and transmission mode display, as well as a COG (Chip On Glass) type liquid crystal device in which an IC chip is directly mounted on a substrate. In FIG. 1, the liquid crystal device 1 includes a liquid crystal panel 2 formed by bonding a first substrate 3a and second substrate 3b with an annular seal member 4, a liquid crystal L is sealed in a gap formed between the two substrates, or in a so-called cell gap. Liquid crystal driver ICs (6a and 6b) are mounted on the first and second substrates 3a and 3b, respectively, and an illumination device 7 is disposed at the opposed side to the observation side, or at the outside of the first substrate 3a in this embodiment, as a back light. The liquid crystal driver crystal driver ICs 6a and 6b are mounted using, for example, an ACF (Anisotropic Conductive Film). The liquid crystal L is sealed into the cell gap through a liquid crystal injection port 4a provided at an appropriate site of the seal member 4, and the port 4a is sealed with a resin after injecting the liquid crystal.

As shown in FIG. 2, the first substrate 3a includes a first substrate 8a made of a glass or plastic and having a rectangular shape viewed from the direction of the arrow B, and a color filter 11, a first electrode 12a and an orientation layer 13a are sequentially formed from the surface side on the inner surface (the upper side in FIG. 2) of the first substrate 8a. The color filter 11 is formed of a dividing member 14, a reflection layer 16, color pixels 17 and a protective layer 9. A polarizer 19a is bonded on the outer surface of the first substrate 8a with an adhesive. As shown in FIG. 5(a), the color filter 11 includes banks 14 as dividing members formed on the first substrate 8a into a grid pattern as viewed from the direction of the arrow C, a plurality of reflection layers 16 formed in a plurality of grid hole regions divided by the banks 14, a color pixel 17 formed on each reflection layer 16, and a protective layer 9 formed on the color pixels. Both the reflection layer 16 and color pixel 17 are formed using an ink-jet method in this embodiment as described below.

Figure 3:
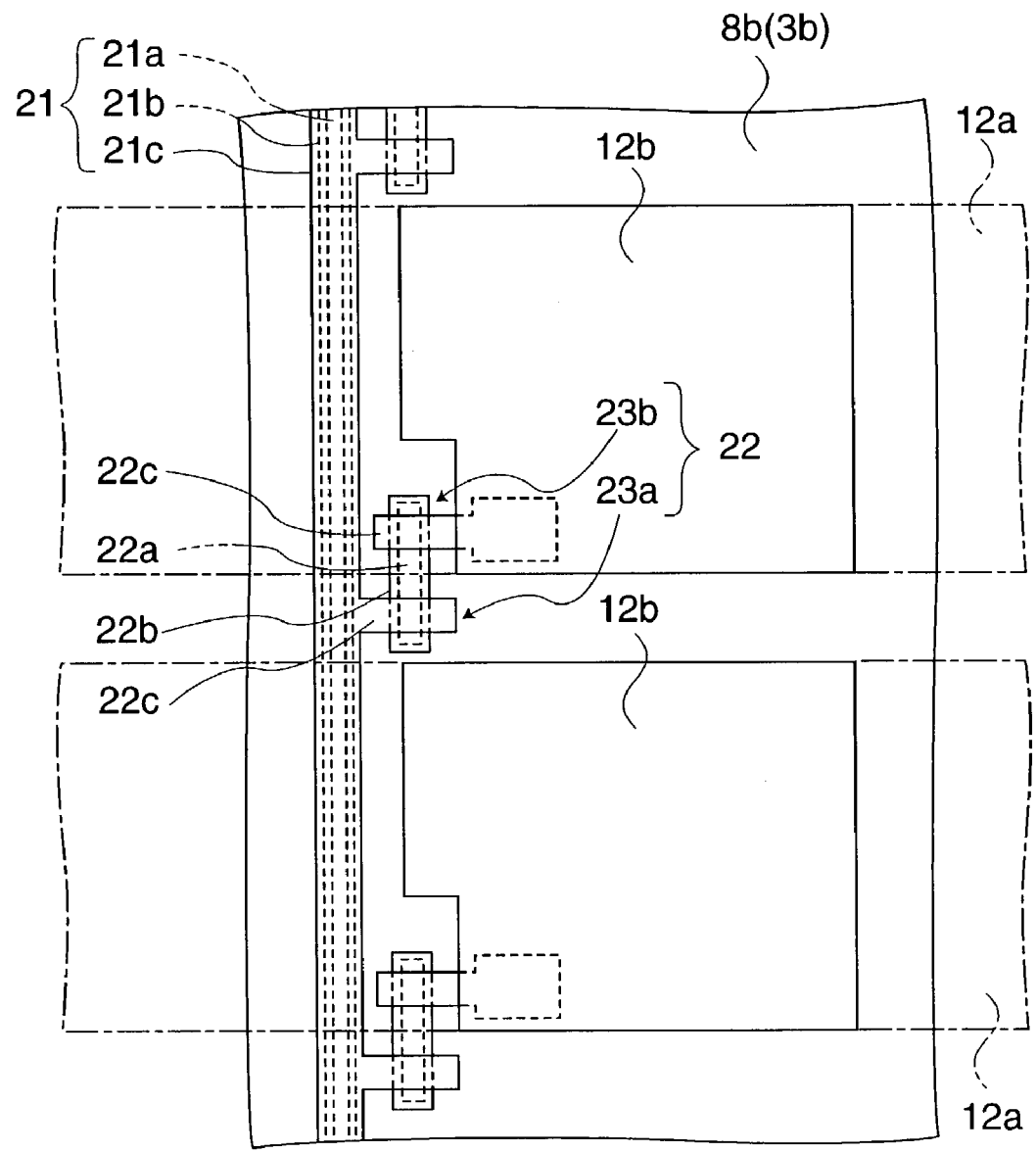
FIG. 3 is an enlarged schematic of the portion indicated by the arrow D in FIG. 1.

Several pixels of the plural color pixels 17, mainly three pixels, are shown with magnification in FIGS. 5(a)-5(c), and the color filter 11 is formed of a lot of these color pixels 17 aligned in the longitudinal and transverse directions as a matrix as viewed from the direction of the array C. Any one of the plural color pixels 17 is provided as a dot capable of independently displaying a color, and one pixel is formed of a unit of three dots including an R color pixel 17R, a G color pixel 17G and a B color pixel 17B. The dot as used herein refers to as an region defined by a overlap region between the first electrode 12a and second electrode 12b, as shown in FIG. 3. Each reflection layer 16 is formed into a hill shape or a dome shape having a peak at the center P as shown in the cross-sectional structure in FIG. 5(a) and FIG. 5(c). This shape is naturally formed by forming the color pixel 16 using the ink-jet method, or when an ink, or the material of the color pixel, is discharged from an ink jet head into each divided region as droplets. The color pixel 17 is formed by aligning three color pixels 17R, 17B and 17G of three colors of R (red), G (green) and blue (B), respectively. The arrangement of each color in a plane is devised to be a striped arrangement as shown in FIG. 4(a), a mosaic arrangement as shown in FIG. 4(b) and a delta arrangement as shown in FIG. 4(c). The striped arrangement as used herein means that the column of the matrix has the same color. The mosaic arrangement means that any three color pixels arranged in a straight line in any direction have three colors of R, G and B. The delta arrangement means that the color pixels in each row are aligned with half pixel width shifted from those in adjoining rows, and adjoining three pixels have different colors of R, G and B with each other. In FIG. 5(a), the bank 14 is formed in this embodiment by coating a non-permeable resin by an arbitrary coating method, for example a spin-coat method, followed by patterning by an arbitrary patterning method, for example by a photolithographic method. The bank 14 formed of the non-permeable resin also functions as a mask to prevent or reduce light from leaking out of the color filter 11. A black mask may be independently patterned as an underlayer of the bank 14.

The protective layer 9 is usually formed of a transparent resin material, and functions as follows. Primarily, breakage of an electrode when it is formed on the color filter substrate is prevented by planarizing the surface of the color filter by forming the protective layer. Secondarily, the contrast ratio among the pixels are improved by using a low resistance electrode on the protective layer. Thirdly, the protective layer protects the pixels in the color filter substrate from being damaged in the step applied after forming the protective layer, or manifests a protective function. Fourthly, impurities are prevented or substantially prevented from being diffused from the color filter into the liquid crystal after the liquid crystal is sealed in the cell gap when the color filter substrate is used for the liquid crystal device.

In FIG. 1, the reflection layer 16 is formed by patterning a liquid material including a light reflective metallic material, such as a colloidal solution containing Al, Ag or Cr, or an alloy thereof, a light permeable resin such as acrylic resin, epoxy resin, fluorine resin and polyimide resin, and an organic solvent for forming a liquid thereof by the ink-jet method. The high transmission region 18 is formed corresponding to each region to form the reflection layer 16, or corresponding to each region divided by the bank 14.

The high transmission region 18 is formed corresponding to the peripheral portion in each divided region divided by the bank 14, or corresponding to the portion having the minimum thickness in the reflection layer 16 formed in each divided region in this embodiment as shown in FIGS. 5(a) to 5(c). The high transmission region 18 is formed into an annular shape along the peripheral portion of each divided region formed into a rectangular shape as shown in FIG. 5(b).

The first electrode 12a is formed into stripes as viewed from the direction of the arrow B as shown in FIG. 2. While the pattern of the first electrode 12a is schematically drawn with wider space and smaller number of stripes in FIGS. 1 and 2 for easy recognition, it is actually formed with a very narrow space and a lot of stripes. The first electrode 12a is formed by depositing, for example, ITO (Indium Tin Oxide) by an arbitrary layer deposition method, for example by sputtering, with a uniform thickness, followed by patterning into a desired shape, for example into stripes, by an arbitrary patterning method, for example by photolithography.

The first electrode 12a is electrically connected to an output bump, or an output terminal, of the liquid crystal driver IC 6a by wiring so as to cross over the a seal member 4 as shown in FIG. 1. The liquid crystal driver IC 6a supplies data signals to the first electrode 12a.

The orientation layer 13a is formed, for example, by baking after coating a polyimide solution. The orientation layer 13a is subjected to an orientation treatment, for example a rubbing treatment, to determine orientation of the liquid crystal molecules in the liquid crystal L in the vicinity of the surface of the first substrate 3a.

In FIG. 1, the second substrate 3b comprises a rectangular second substrate 8b formed of a glass or plastic, and a pattern comprising a plurality of dots of second electrode 12b aligned in a matrix is formed on the inner surface (lower side in FIG. 1) of the second substrate 8b. While the dots of the second electrode 12b are magnified in FIG. 1 for easy recognition, they actually include a lot of the fine second electrodes 12b.

FIG. 3 shows a magnified portion of the second substrate 3b indicated by the arrow D. As shown in FIG. 3, wiring lines 21, TFD elements 22 as switching elements extending from the wiring lines 21, and the second electrode 12b connected to the wiring lines 21 via the TFD element 22. It has been already described that the plural second electrodes 12b are aligned in a matrix as shown in FIG. 1.

Each element described above is formed as follows. After uniformly depositing a Ta (tantalum) layer by sputtering, the Ta layer is patterned to form the first layer 21a of the wiring lines 21 and the first metal layer 22a of the TFD elements 22.

Then, the second layer 21b is formed on the first layer 21a of the wiring limes 21 by anodic oxidation treatment, followed by forming an insulation layer 22b on the first metal layer 22a of the TFD elements. Subsequently, after uniformly forming a Cr (chromium) layer by sputtering, it is patterned to form a third layer 21 c on the second layer 21b of the wiring lines 21. A second metal layer 22C extending from the wiring lines 21, and the second metal layer to connect between the insulation layer 22b and second electrode 12b are formed on the insulation layer 22b of the TFD elements 22.

As a result, the TFD element 22 has a first TFD element 23a proximal to the wiring lines 21 and a second TFD 23b proximal to the second electrode 12b.

The first TFD element 23a includes a layer structure of the second metal layer 22c/insulation layer 22b/first metal layer 22a, or a MIM (Metal-Insulator-Metal) structure, as viewed from the line wiring 21 side. The second TFR element 23b includes a layer structure of the first metal layer 22a/ insulation layer 22b/second metal layer 22c, or the MIM structure, as viewed from the line wiring 21 side.

The TFD structure is referred to as a back-to-back structure in which two TFD elements are connected in series with electrically inverse directions with each other, and this structure is employed to stabilize the switching characteristics of the MIM element. When such high stability is not needed with respect to the switching characteristics, a single structure TDF element including one TFD element may be used in place of the back-to-back structure.

The second electrode 12b to be connected to the second metal layer 22c of the second TFD element 23b is formed by any patterning method, for example by the photolithographic method, after depositing ITO (13) by any layer deposition method, for example by the sputtering method. The first electrode 12a formed on the first substrate 3a facing the second substrate 3b as shown in FIG. 1 is disposed in a direction crossing the wiring lines 21, for example in a perpendicular direction to the wiring lines, as shown in FIG. 3.

The orientation layer 13b is formed on the second electrode 12b as shown in FIG. 2. While the second electrode 12b is schematically illustrated with magnification for easy recognition in FIG. 2, it is actually formed of a lot of quite fine electrodes. The orientation layer 13b is formed, for example, by baking after coating a polyimide solution. The orientation layer is subjected to an orientation treatment, for example a rubbing treatment, to determine the orientation of the liquid crystal molecules in the liquid crystal L in the vicinity of the surface of the second substrate 3b.

A polarizer 19b is bonded with an adhesive on the outer surface of the second base material 8b. This polarizer 19b is attached to the second substrate 8b so that its polarization axis is offset by a given angle relative to the polarization axis of the polarizer 19a at the first substrate 3a side.

The line wiring 21 on the second substrate 3b is electrically connected to the output bump, or the output terminal, of the liquid crystal driver IC 6b by wiring so as to cross over the seal member 4, as shown in FIG. 1. The liquid crystal driver IC 6b supplies a scanning signal or data signal other than those which are supplied to the first electrode 12a to one line of the switching elements 22 in accordance with the wiring lines 21.

The illumination device 7 disposed on the first substrate 3a, or on the back face of the substrate in opposed relation to the observation side, includes an optical guide 24 having approximately the same area as the first substrate 3a as shown in FIG. 1, and a plurality of LEDs 26, for example three LEDs, as light sources disposed facing a light intake port 24a at one side face of the optical guide 24. The optical guide 24 is formed of, for example, an acrylic resin, polycarbonate resin or a glass, and propagates light imported from the light intake port 24a into the optical guide and supplies it to the liquid crystal panel 2 by emitting a planar light from a light emitting face 24b facing the liquid crystal panel 2.

The first substrate 3a and second substrate 3b are bonded with each other by the seal member 4 while maintaining the cell gap with spacers 27 dispersed on any one of the substrates as shown in FIG. 2, and the liquid crystal L is sealed in the cell gap. The liquid crystal L used is, for example, a TN (Twisted Nematic) liquid crystal.

Since the liquid crystal device 1 according to the present invention is so constructed as described above, an external light such as sunlight and room light imported from outside of the first substrate 3b at the observation side as shown in FIG. 2 is reflected back by the reflection layer 16 after passing through the liquid crystal, and is supplied to the liquid crystal again, when the liquid crystal device functions as a reflection mode liquid crystal device.

The LEDs 26 constituting the illumination device 7 emit a light, which is imported from the light intake port 24a of the optical guide 24, and is evenly emitted from the light emitting face 24b in a plane when the liquid crystal device functions as a transmission mode liquid crystal device. The emitted light is supplied to the liquid crystal L through the region 18 having a high light transmittance formed on the reflection layer 16.

A voltage corresponding to a switching operation of the switching element 22 is impressed between the first electrode 12a and second electrode 12b with interposition of the liquid crystal L in either the reflection mode display or transmission mode display, thereby controlling the orientation of the liquid crystal molecules in the liquid crystal L. The light supplied to the liquid crystal L is modulated by this orientation control, the modulated light reaches the polarizer 19b, and an image is displayed at the observation side by the polarized light passing and not passing through the polarizer 19b. The desired color is displayed by selecting the reflection light after passing through either the R, G or B filter of the color filters 11.

Since the minimum thickness portion of the color pixel 17 is formed corresponding to the high transmittance region 18 of the reflection layer 16 as shown in FIGS. 5(a) to 5(c), the color is displayed by a light passing back and forth through the minimum thickness region of the color pixel 16 in the reflection mode display as shown by the arrow X0, while the color is displayed by a light passing though the region other than the minimum thickness region of the color pixel 17 in the transmission mode display as shown by the arrow X1.

The image is displayed by the light once passing through the maximum thickness region of the color pixel 17 in the transmission mode display, while the image is displayed by the light passing back and forth, or twice, through the thin region of the color pixel in the reflection mode display. Consequently, the optical thickness in the reflection mode display and the optical thickness in the transmission mode display may be made approximately close with each other, thereby enabling uniform color display between the two modes. When the reflection layer is formed by the ink-jet method as in this embodiment (details thereof are described below), the central region of the reflection layer 16 divided by the bank 14 swells as shown in FIGS. 5(a) and 5(c), and the layer tends to be thinner at the periphery. Accordingly, the optical thickness for the reflection mode display and the optical thickness for the transmission mode display may become approximately equal or come close with each other by providing the high transmission region 18 corresponding to the periphery of the reflection layer 16 as in this embodiment, enabling a uniform color display between the two display modes.

Furthermore, the color filter is divided into a plurality of rectangular regions by the bank 14 as shown in FIGS. 5(a) to 5(c) in this embodiment, and the reflection layer 16 is formed in each rectangular region. The high transmission region 18 of the reflection layer 16 is formed as a slender rectangle along the longitudinal direction of the rectangular divided region. This construction permits a uniform and sufficient light to be supplied in the longitudinal direction of the color pixel 17 in the transmission mode display, thereby enabling a uniform color display.

Figure 5:
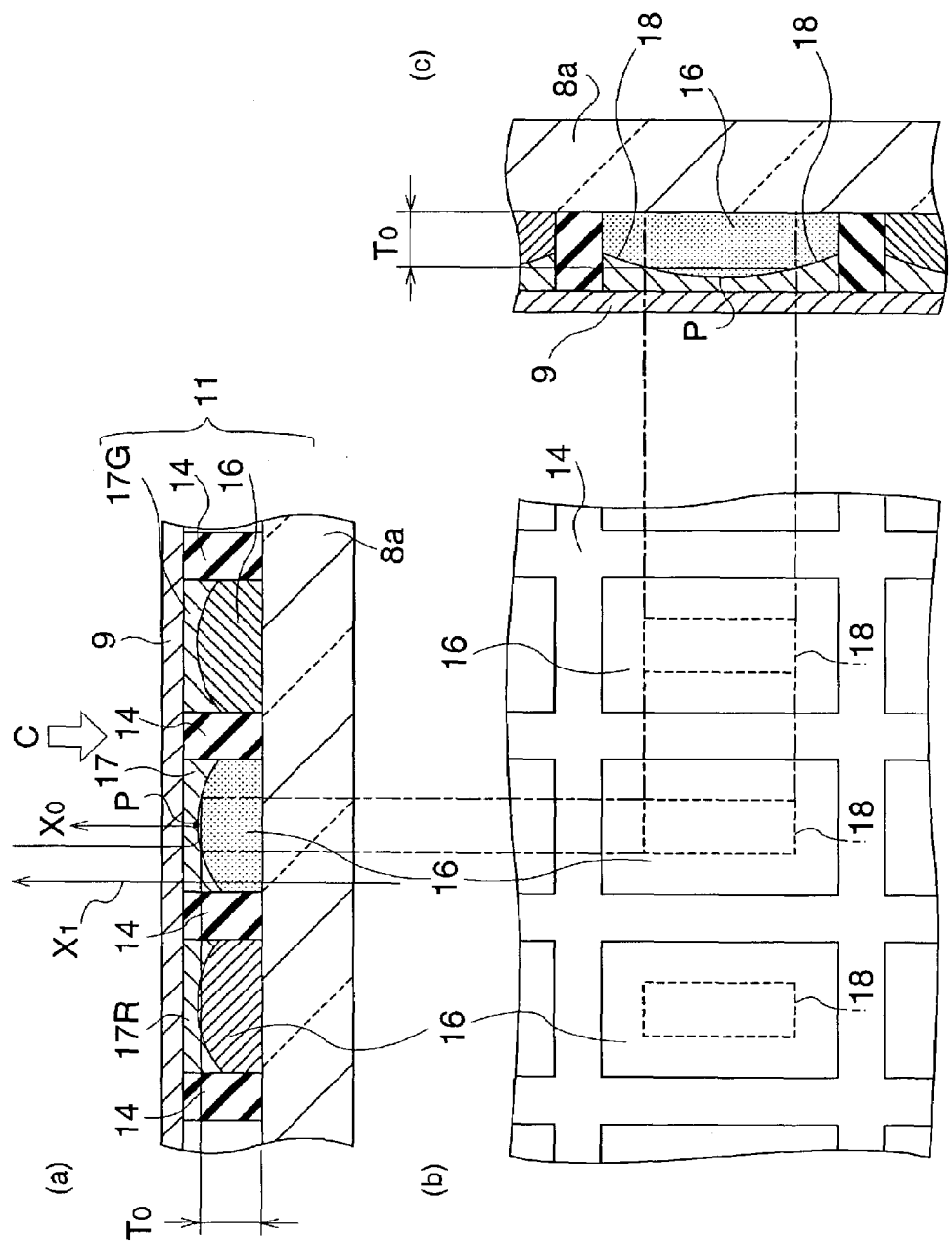
FIGS. 5(a) to 5(c) are schematics that show the structure of one pixel of the color filter, where
Figure 6:
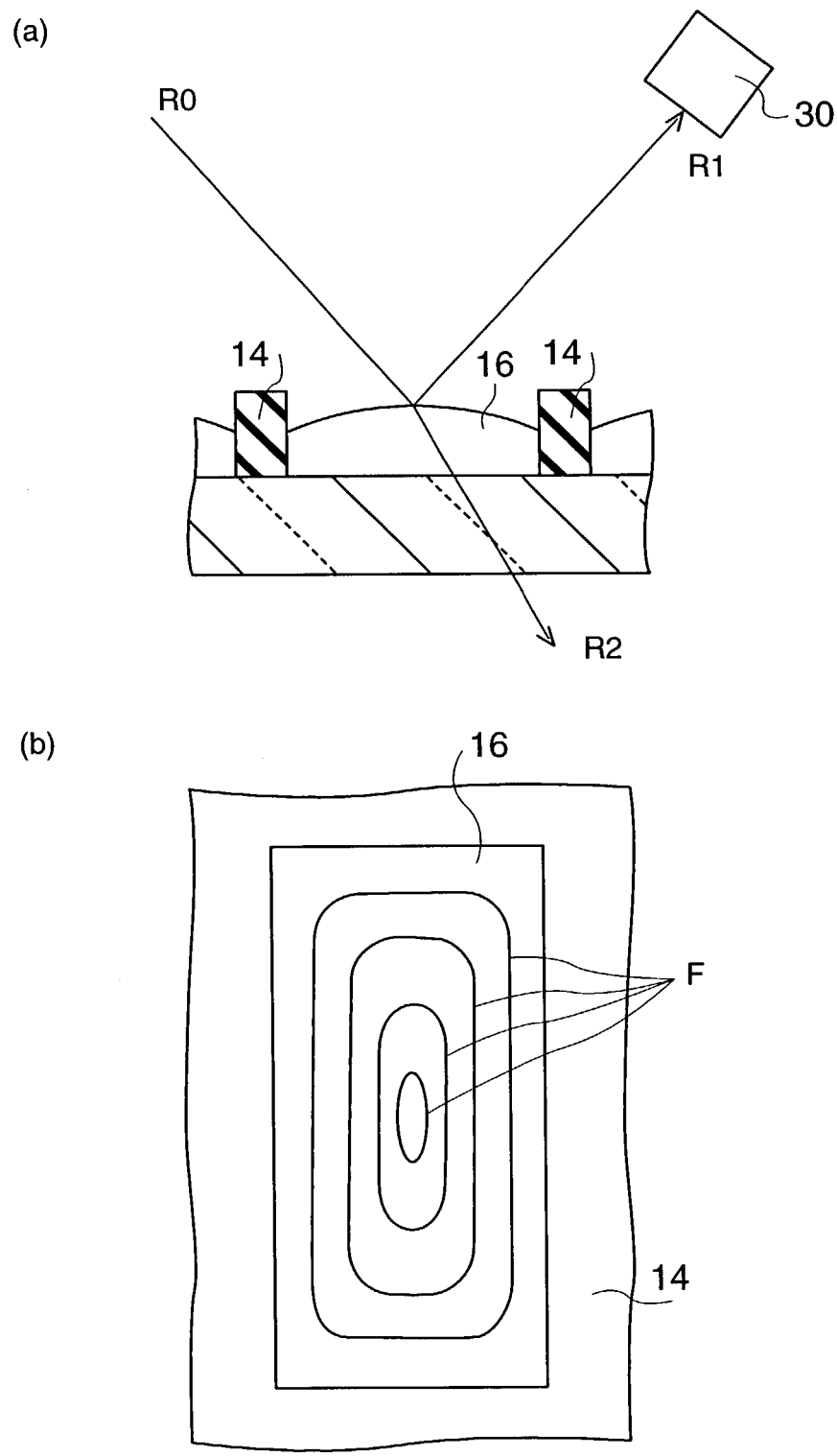
FIGS. 6(a) and 6(b) are schematics describing the method for measuring the thickness of the reflection layer, where

FIG. 6 is a schematic that describes one method for determining the planar shape of the high transmission region 18 shown in FIG. 5. The method is described below. When the reflection layer is formed by supplying an ink, or a half-mirror material having the light reflection characteristics and light transmittance characteristics together into the region divided by the bank 14 as in this embodiment, the thickness of the reflection layer is not always formed to be uniform in the plane. For example, the layer may be swelled as a hill or dome, as shown in FIGS. 5(a) and 5(c). It is desirable to form the high transmission region 18, for example, only in the region of the reflection layer 16 corresponding to the region having a smaller thickness of the reflection layer 16 than the standard thickness T0, when the thickness of the reflection layer 16 is not uniform in the plane as described above. Such uneven thickness permits the color display in the reflection mode display and color display in the transmission mode display to be more uniform with each other.

It is effective to determine the shape of the high transmission region by taking advantage of optical interference patterns, when the shape of the high transmission region 18 provided on the reflection layer 16 is formed corresponding to the thickness of the reflection layer. Practically, the reflection light R1 from the reflection layer 16 is photographed with a camera 30 by irradiating a natural light R0 to the reflection layer 16 as shown in FIG. 6(a), and the photographic image is displayed on a screen. Then, an interference pattern F as schematically illustrated in FIG. 6(b) is confirmed depending on the difference of the thickness of reflection layer 16. This interference pattern F is considered to represent contour lines of the reflectivity of the reflection layer 16.

Accordingly, the high transmission region 18 that accurately matches the thickness of the color pixel 17 can be formed by selecting one of the desirable pattern of the interference patterns F, and by forming the high transmission region on the reflection layer 16 in accordance with the interference pattern.

The proportion of the high transmission region is set to 5 to 45%, desirably 30%, in the various high transmission regions 18 as described above. The proportion of the high transmission region as used herein refers to as a area ratio of the high transmission region 18 to the area of the region divided by the bank 14, or the planar area of each color pixel 17.

A good recognition of vision may be obtained in both the reflection mode display and transmission mode display when the ratio of the high transmission region is within the range as described above. The display becomes not clear due to an insufficient amount of the reflection light when the ratio of the high transmission region is larger than the upper range above, while the display also becomes not clear due to insufficient illumination effect of the illumination device when the ratio of the high transmission region is smaller than the lower limit described above.

(Embodiment of the Method for Manufacturing the Liquid Crystal Device)

Figure 7:
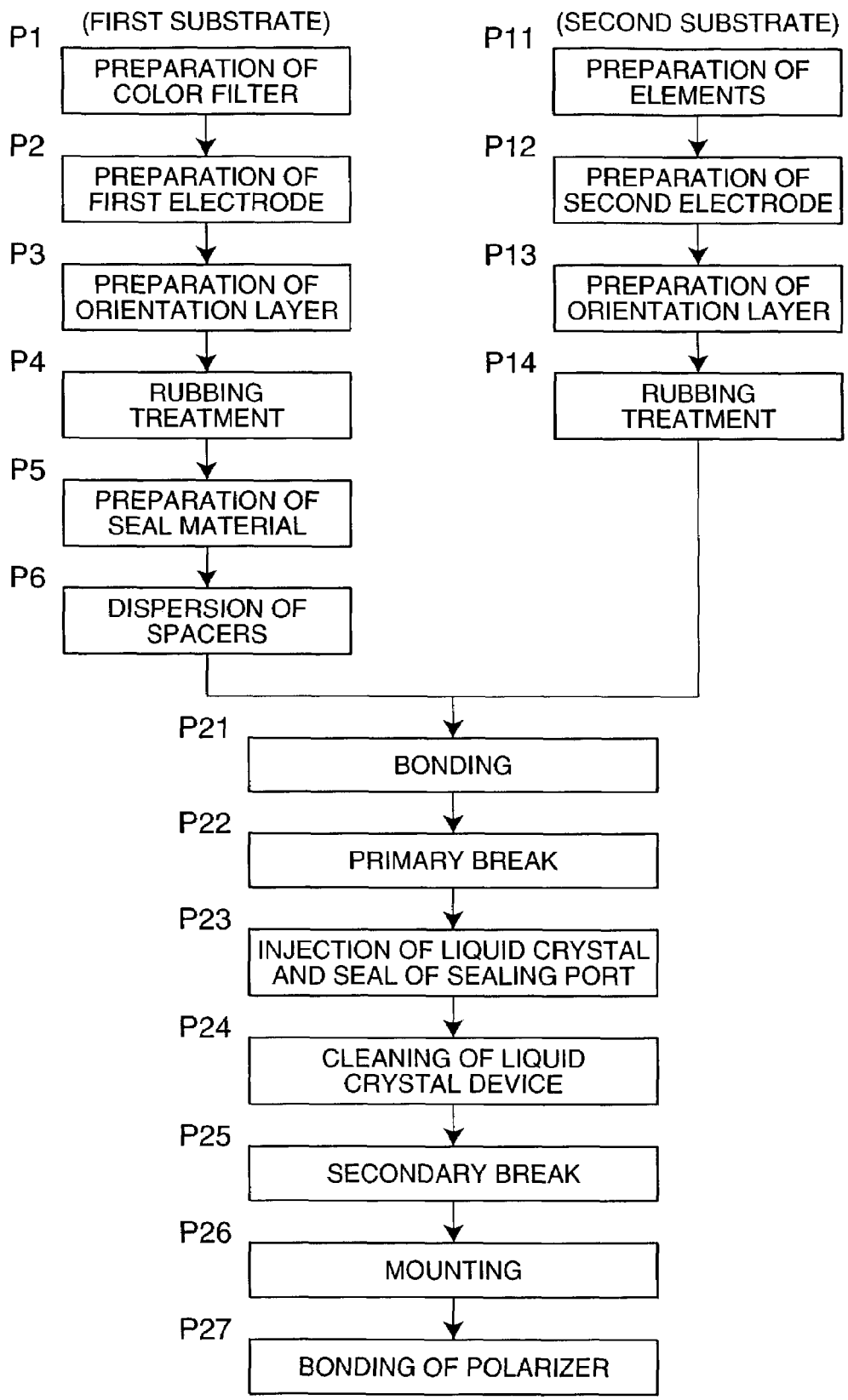
FIG. 7 is a flowchart that shows a manufacturing flow sheet showing one embodiment of the method for manufacturing the liquid crystal device according to the present invention.
Figure 8:
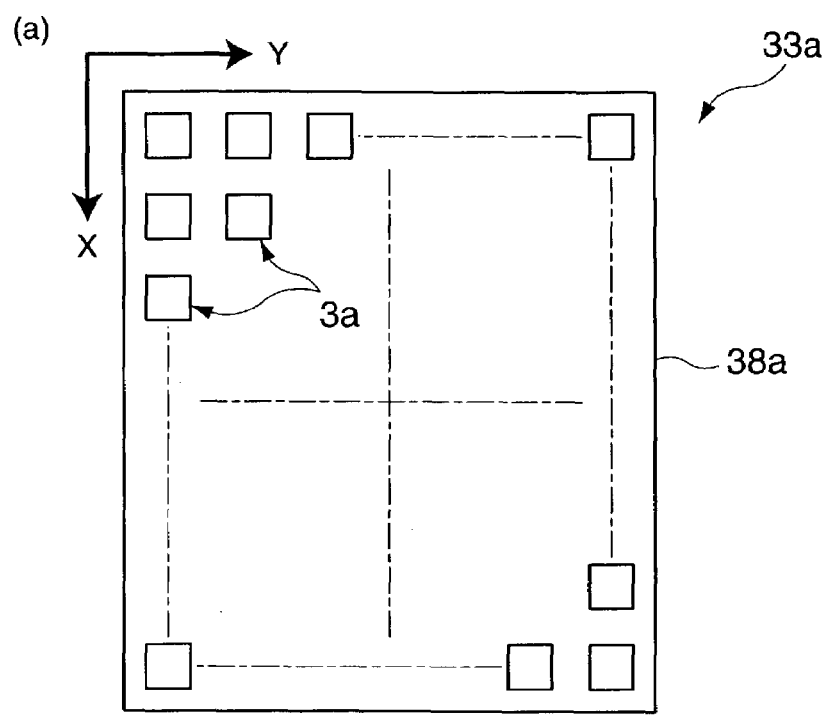
FIGS. 8(a) and 8(b) are schematic plan views of the mother substrate obtained in one step in the manufacturing method in FIG. 7.
Figure 8:
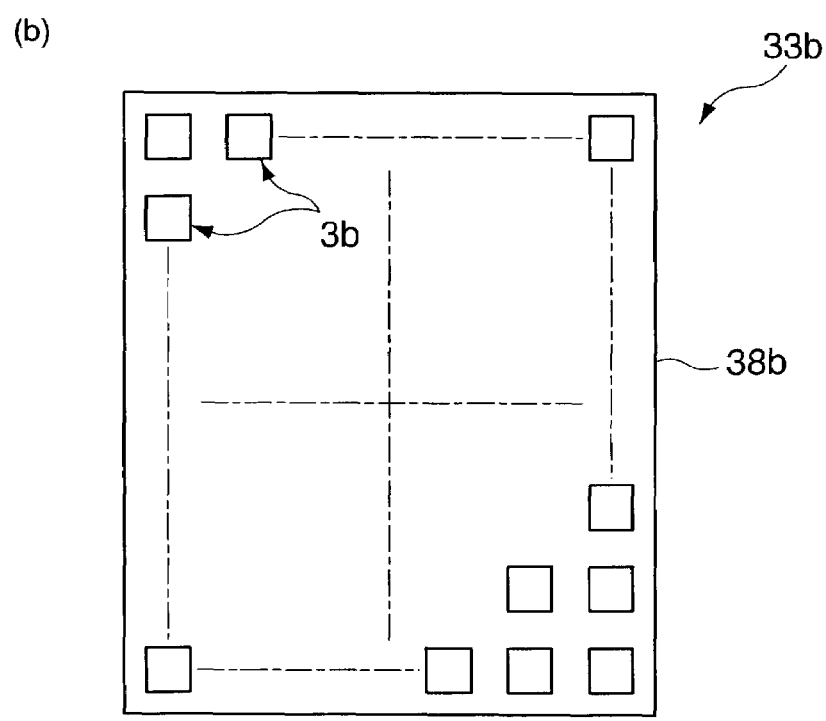

FIG. 7 is a flowchart that shows one embodiment of the method for manufacturing the liquid crystal device 1 shown in FIG. 1. In this manufacturing method, a series of steps from the steps P1 to P6 correspond to the steps for manufacturing the first substrate 3a, and a series of steps from the step P11 to P 14 correspond to the steps for manufacturing the second substrate 3b. The steps for manufacturing the first substrate and the steps for manufacturing the second substrate are independently proceeded with each other. The first substrate 3a and the second substrate 3b with the sizes as shown in FIG. 1 are not directly formed in this embodiment. Instead, a first mother substrate 33a having a size corresponding to several pieces of the first substrate 3a and a second mother substrate 33b having a size corresponding to several pieces of the second substrate 3b as shown in FIGS. 8(a) and 8(b), respectively, are formed, and each of the first and second substrates 3a and 3b is manufactured by cutting the mother substrates 33a and 33b, respectively.

The steps for manufacturing the first substrate are described in FIG. 7. A color filter 11 corresponding to the plural liquid crystal panels 2 is formed (step P1) on the surface of a large area first mother substrate 38a (see FIG. 8(a)) made of a transparent glass or plastic, and the first electrode 12a is formed by photolithography (step P2).

Subsequently, the orientation film 13a is formed on the first electrode 12a by coating or printing (step P3), followed by determining the initial orientation of the liquid crystal by applying an orientation treatment, for example a rubbing treatment(step P4). Then, the annular seal member 4 is formed on the periphery of each liquid crystal panel region by screen printing, (step P5) and spherical spacers 27 are dispersed thereon (step P6). The large area mother first substrate 33a (FIG. 8(a)) having plural panel patterns on the first substrate 3a of the liquid crystal panel 2 is formed by the steps as described above.

The steps for forming the second substrate (steps P11 to P14 in FIG. 7) is performed independently from the steps for forming the first substrate. Practically, a second mother substrate 38b (see FIG. 8(b)) formed of a light permeable glass or a light permeable plastic is prepared, and a plurality of the wiring lines 21 and switching elements 22 shown in FIG. 3 are formed on the surface of the second mother substrate 38b (step P11), followed by forming dots of the second electrode 12b with ITO using a photolithographic method (step P12).

Subsequently, the orientation film 13b (see FIG. 2) is formed by coating or printing (step P13), and the initial orientation of the liquid crystal is determined by applying an orientation treatment, for example a rubbing treatment, to the orientation film 13b (step P14). The large area second mother substrate 33b having plural panel patterns on the second substrate 3b of the liquid crystal panel 2 is formed by the steps described above.

After forming the large area first mother substrate 33a and second mother substrate 33b by the steps above, the mother substrates are aligned, or positioned, with interposition of the seal member 4, followed by bonding with each other (step P21). An empty panel structure comprising a panel region corresponding to the plural liquid crystal panels in which no liquid crystal has been sealed is formed by these steps.

The completed empty panel structure is broken, or cut, to form a striped shaped empty panel structure in which the liquid crystal injection port 4a on the seal member 4 of each liquid crystal panel (see FIG. 1) is exposed to the outside (step P22). The liquid crystal L is injected thereafter into each liquid crystal panel through the exposed liquid crystal injection port 4a, followed by sealing the liquid crystal injection port 4a with a resin (step P23).

In the usual liquid crystal injection process, the liquid crystal is stored in a storage vessel, the storage vessel storing the liquid crystal and the empty panel are placed in a chamber, the tablet shape empty panel is dipped in the liquid crystal in the chamber while maintaining the chamber in vacuum, and the chamber is open in the atmospheric pressure. Since the inside of the empty panel maintains the vacuum, the liquid crystal compressed by the atmospheric pressure is introduced into the panel through the liquid crystal injection port. A cleaning treatment is required for the tablet shape panel in the step P24 after injecting the liquid crystal, since the liquid crystal is adhered around the liquid crystal structure after injection of the liquid crystal.

The tablet shape mother panel after injection and cleaning of the liquid crystal is again subjected to a scribe treatment, or cutting treatment, thereby cutting the plural liquid crystal panels into respective pieces (step P25). The liquid crystal driver ICs 6a and 6b are mounted on each liquid crystal panel 2 manufactured as described above as shown in FIG. 1, and the illumination device 7 is attached as a back light (step P26). The polarizer 19a is attached on the outer surface of the first substrate 3a, and the polarizer 19b is attached on the outer surface of the second substrate 3b (step P27), thereby completing the desired liquid crystal device 1.

The step P1 for forming the color filter in FIG. 7 in the step for forming the first substrate is detailed as follows.

Figure 9:
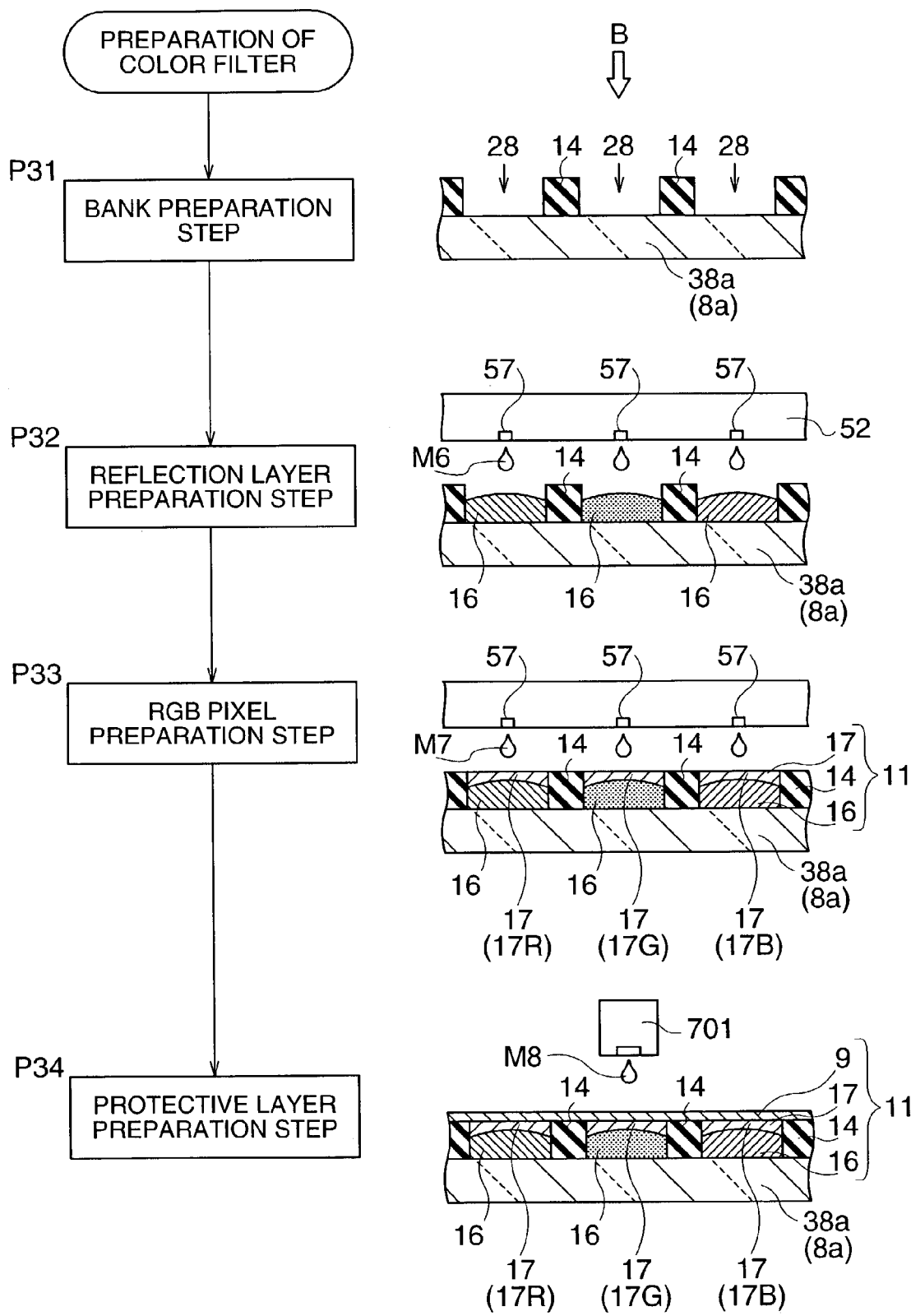
FIG. 9 is a schematic and flowchart that show one embodiment of the flow diagram to form color filter in one step of the manufacturing method shown in FIG. 7.

FIG. 9 is a flowchart and schematic of the method for manufacturing the color filter 11 in the order of the manufacturing steps. In the first step, the bank 14 is patterned as a lattice as viewed from the direction of the arrow B using an opaque resin material on the mother substrate 38a made of a glass or plastic (step P31). The void region 28 of the lattice pattern is a region in which the reflection layer 16 and color pixel 17 are formed, or the color pixel forming region.

The planar size of each color pixel forming region 28 formed by this bank 14 as viewed form the direction of the arrow B is about 30 μm×100 μm. The bank 14 is desirably uniformly formed with a given thickness with an ink-repelling resin using an arbitrary layer deposition method, for example the spin-coat method, followed by forming a lattice pattern by an appropriate method, for example the photolithographic method.

The reflection layer 16 is formed in the region divided by the bank 14 thereafter using the ink-jet method in the step P32. Practically, the surface of the mother substrate 38a is scanned with the ink-jet head 52, and the reflection layer material M6 is discharged from the nozzle 57 provided on the ink-jet head 52 as ink droplets with a predetermined timing corresponding to any one of the alignment patterns shown in FIG. 4 to adhere the ink on the mother substrate 38a. The reflection layer material M6 is cured thereafter by a baking treatment at 300° C. for 30 to 60 minutes, thereby depositing the reflection layer 16.

Subsequently, the R, G and B color pixels 17 are formed in each region divided by the bank 14 using the ink-jet method in the step P33. Actually, the surface of the mother substrate 38a is scanned with the head 52 as in the case of the reflection layer 16, and the color pixel material M7 is discharged as ink droplets from the nozzle 57 provided on the head 52 with a predetermined timing corresponding to any one of the alignment patterns shown in FIG. 4 to adhere the ink on each reflection layer 16 on the mother substrate 38a. The color pixel material M7 is cured by the baking or UV irradiation treatment to form the color pixel 17. The pattern of a desired color pixel is formed by repeating this process for the color pixels 17R, 17G and 17B.

The protective layer 9 is formed thereafter on each region divided by the bank 14 using the spin-coat method in the step P34. Actually, a predetermined amount of the protective layer material M8 is dripped from the drip nozzle 701 attached to the spin-coater, and the protective layer material M8 is uniformly adhered on the mother substrate 38a by rotating the mother substrate 38a at high speed, for example at 1000 rpm. Then, the protective layer material M8 is cured by the baking or UV irradiation treatment to form the protective layer 9.

In the ink-jet treatment in the reflection layer forming step P32, a predetermined amount of ink drops are supplied in all the plural hollow lattice space formed by the bank 14 during one scanning period of the head 52.

In the ink jet treatment in the color pixel 17 forming step P33, on the other hand, the three color pixels of R, G and B may be formed by repeating scanning of the head 52 for every R, G and B color pixels, or may be simultaneously formed by one scanning by providing one head with the nozzles for the three colors of R, G and B.

The head 52 used for the reflection layer forming step P32, and the head 52 used for the color pixel forming step P33 may be attached to the same ink-jet apparatus by replacing them, or may be provided on different ink-jet apparatus, respectively, and each ink-jet apparatus may be independently used. Alternatively, the same head 52 and the same ink-jet apparatus may be used, and the ink supplied to the head 52 is replaced between the reflection layer material and color pixel material.

The scanning methods of the mother substrate 38a using the ink-jet head 52 in the reflection layer forming step P32 and color pixel forming step P33 are not particularly restricted, and various methods may be elucidated. For example, a plurality of nozzles 57 are arranged with an approximately same length as the length of one side of the mother substrate 38a, and the reflection layer material M6 or the color pixel material M7 is supplied on the entire surface of the mother substrate 38a by one scanning. Otherwise, in the case of the head 52 having a shorter nozzle array than the length of one side of the mother substrate 38a, main scanning to discharge the ink and sub-scanning to shift the scanning position are repeated to supply the ink over the entire surface of the mother substrate 38a.

Any methods may be used in the protective layer forming step P34 so long as the method is able to uniformly form the protective layer on the color pixel 9, and is not necessarily restricted to the spin-coat method. For example, arbitrary methods such as roll-coat method, printing method and ink-jet method may be used.

Figure 10:
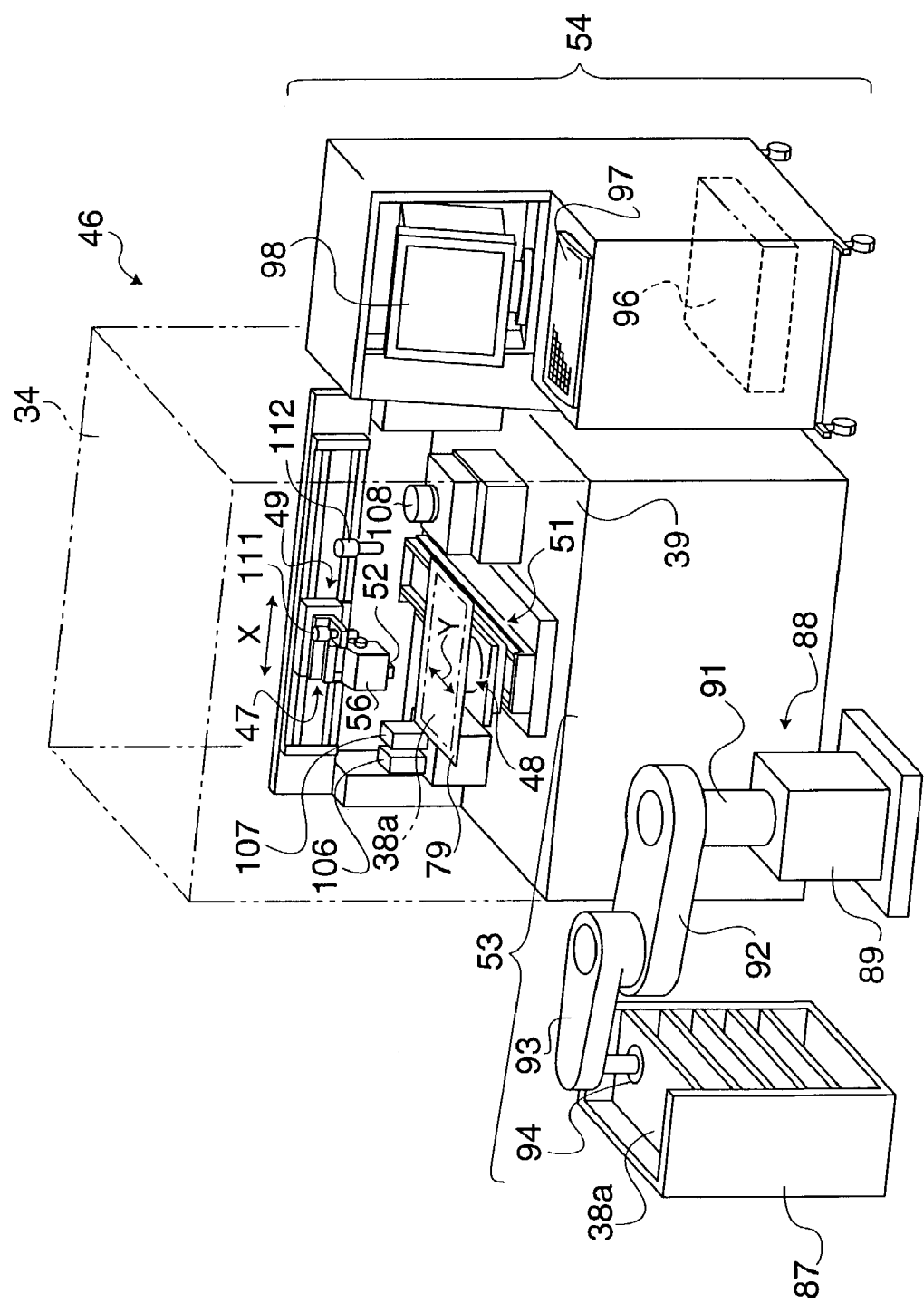
FIG. 10 is a perspective view of one embodiment of the ink-jet apparatus to be used in the manufacturing step in the manufacturing method shown in FIG. 9.

FIG. 10 shows one embodiment for the reflection layer forming step P32 and color pixel forming step P33 in FIG. 9. The ink-jet apparatus 46 is used to discharge, followed by adhering, the ink of the reflection layer material or color pixel material as droplets on prescribed positions in each substrate region 3a on the mother substrate 38a (see FIG. 8(a)).

In FIG. 10, the ink-jet apparatus 46 includes a head unit 56 provided with the head 52, a head position controller 47 to control the position of the head 52, a substrate position controller 48 to control the position of the mother substrate 38a, a main scanning drive device 49 of the head 52 relative to the mother substrate 38a, a sub-scanning drive unit 51 of the head 52 relative to the mother substrate 38a, a substrate feeder 53 to feed the mother substrate 38a to a predetermined work site in the ink-jet apparatus 46, and a controller 54 engaged in overall control of the ink-jet apparatus 46.

The head position controller 47, the substrate position controller 48, the main scanning drive device 49, and the sub-scanning drive unit 51 are mounted on the base 39. These devices are covered with a cover 34, if necessary.

As shown in FIGS. 12(a) and 12(b), the head 52 includes a plurality of head units 50, six head units in this embodiment, and a carriage 55 as a support member to support the aligned head units 50. The carriage 55 includes hollow spaces, or depressions, with a diameter a little larger than the head unit 50 at the positions to support the head units 50. The head units 50 are placed in respective hollow spaces, and are secured with screws or an adhesive, or by other bonding methods. When the position of the head unit relative to the carriage 55 is accurately determined, on the other hand, the head unit 50 may be secured only by compression with no use of the bonding methods.

As shown in FIG. 12(b), the head unit 50 includes a nozzle array 58 formed by aligning the plural nozzles 57 as an array. For example, the number of the nozzles 57 is 180, and the hole diameter of the nozzle 57 is 28 μm, and the pitch between the nozzles 57 is 141 μm. The mark X in FIG. 12(a) denotes the direction of main scanning of the ink-jet head 52, and the mark Y denotes the direction of sub-scanning.

Main-scanning of the head 52 on the mother substrate 38a is performed by allowing the head to move in the direction parallel to the X-direction. The reflection layer material or color pixel material as the ink is selectively discharged from the plural nozzles 57 in the head unit 50, and the reflection layer material or color pixel material is made to adhere on prescribed positions on the mother substrate 38a. The head 52 also moves in the direction parallel to the sub-scanning direction Y by a predetermined length, for example by a length L0 corresponding to the length of one array of the nozzle 58 or by a length of an integer fold of L0, thereby permitting the main-scanning position to be shifted with a predetermined distance.

The nozzle array 58 of each head unit 50 is adjusted so that the nozzle array is aligned on a linear line Z when the head unit 50 is mounted on the carriage 55. The distance D between the adjacent head units 50 is adjusted so that the distance between the nozzles 57 at the outermost ends belonging to each of an adjacent pairs of the head units 50 becomes equal to the length L0 of the nozzle array 58 in each head unit 50. Such arrangement with respect to the nozzle array 58 is provided in order to make control of main scanning in the X-direction and sub-scanning in the Y-direction of the ink-jet head 52 simple, and the arrangement of the nozzle array 58, or the arrangement of the head unit 50 relative to the carriage 55 may be arbitrarily adjusted other than those described above.

The head unit 50 has an inner structure such as those shown in FIGS. 14(a) and 14(b). For example, the head unit 50 includes a nozzle plate 59 made of stainless steel, a vibration plate 61 facing the nozzle plate, and a plurality of dividing members 62 to bond the nozzle plate and vibration plate. A plurality of ink chambers 63 and liquid reservoirs 64 are formed between the nozzle plate 59 and vibration plate 61 with the dividing member 62. The plural ink chambers 63 and liquid reservoirs 64 are communicating with each other through conduits 68.

An ink feed hole 66 is formed at an appropriate position on the vibration plate 61, and an ink feeder 67 is connected to the ink feed hole 66. The ink feeder 67 supplies the reflection layer material M or color pixel material M to the ink feed hole 66. The reflection layer material M or color pixel material M supplied is filled in the liquid reservoir 64 followed by filling the ink chamber 63 through the conduit 68. The color pixel material M supplied from the ink feed device 67 is any one of the R, G and B colors, and a different head unit is provided for each color.

The color pixel material M is prepared by dispersing each color material of R, G and B in a solvent. The reflection layer material M contains a light reflecting metallic material and light permeable resin material. The light reflecting metal includes at least one of Ag, Al and Cr, and the light permeable resin comprises a thermosetting resin or light curing type resin including at least one of the acrylic resin, epoxy resin, polyimide resin and fluorine resin. The viscosity of the reflection layer material is desirably adjusted to 4 cps to 50 cps, since a viscosity of less than 4 cps makes it difficult to form a given shape due to its excessive fluidity, while a viscosity exceeding 50 cps makes it difficult to discharge a given volume of the ink from the nozzle 57.

The nozzle 57 to blow a jet of the reflection layer material M or color pixel material M from the ink chamber 63 is provided on the nozzle plate 59. An ink compressor 69 is provided on the back face of the face to form the ink chamber 63 on the vibration plate 61 so as to correspond to the ink chamber 63. This ink compressor 69 includes a piezoelectric element 71, and a pair of electrodes 72a and 72b with interposition of the piezoelectric element. The piezoelectric element 71 is deformed by distortion so as to protrude out into the outside indicated by the arrow C by flowing an electric current through the electrodes 72a and 72c so that the volume of the ink chamber 63 increases. The reflection layer material M or the color pixel material M corresponding to the increased volume flows into the ink chamber 63 from the liquid reservoir 64 through the conduit 68.

The piezoelectric element 71 and vibration plate 61 return to their initial states by removing the electrical current to the piezoelectric element 71. Since the volume of the ink chamber 63 also returns to its original volume, the pressure of the light refection layer material M or the color pixel material M filled in the ink chamber 63 is increased, and the reflection layer material M or the color pixel material M blows out from the nozzle 57 toward the mother substrate 38a (see FIG. 8(a)) forming droplets M6 or M7. An ink-repelling layer 73 includes a Ni-tetrafluoroethylene coprecipitation plating layer is formed in the periphery of the nozzle 57 in order to prevent or substantially prevent or substantially prevent the droplets M6 or M7 from making curved flight or the nozzle 57 from being clogged.

Figure 11:
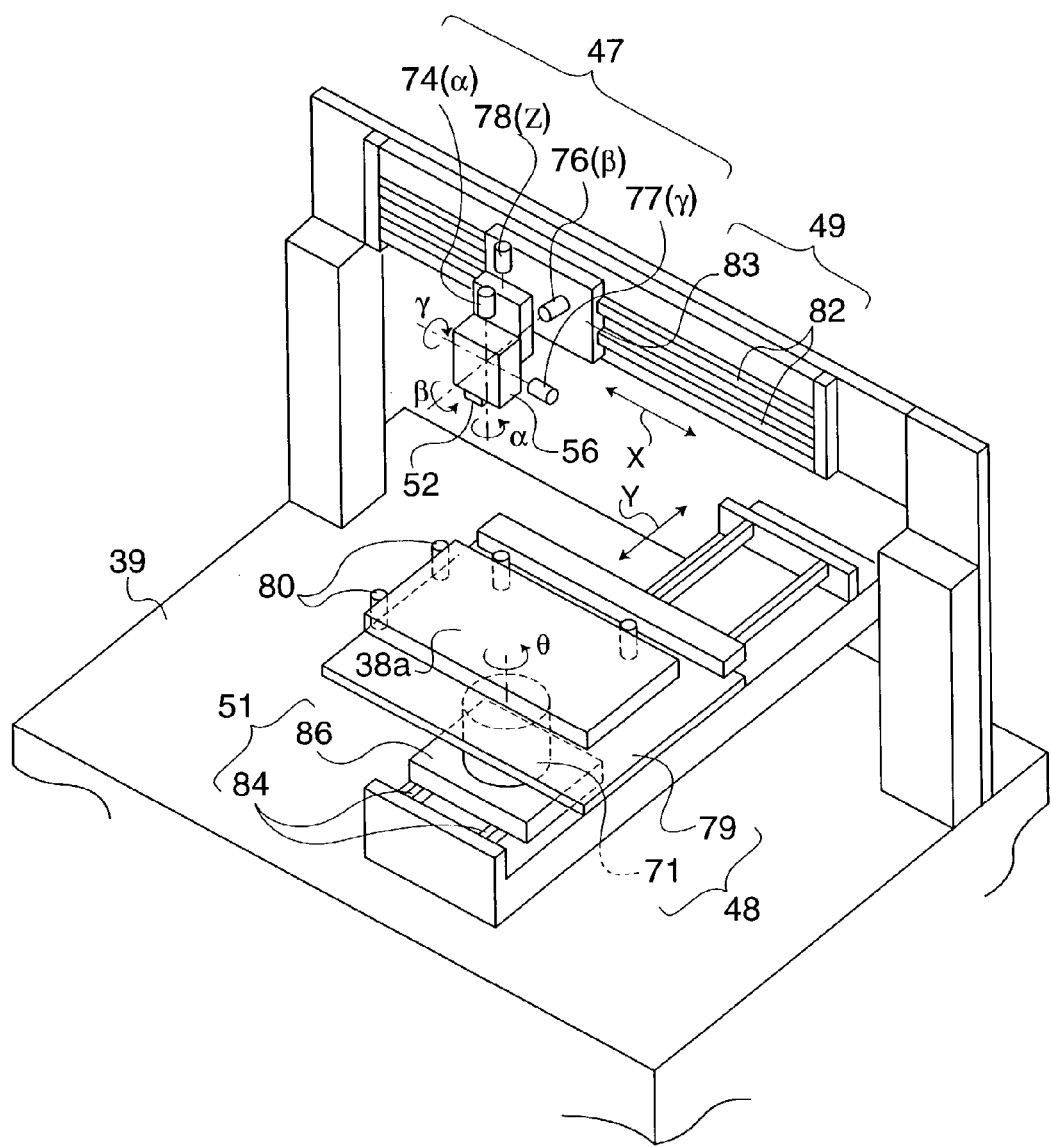
FIG. 11 is an enlarged perspective view of the main part of the device in FIG. 10.

As shown in FIG. 11, the head position controller 47 includes an α-motor 74 to allow the head 52 to rotate in a plane, a β-motor 76 for allowing the head 52 to perform oscillatory rotation around a rotation axis parallel to the sub-scanning direction Y, a γ-motor 77 to allow the head 52 to perform oscillatory rotation around a rotation axis parallel to the main scanning direction X, and a Z-motor 78 for allowing the ink jet head 52 to perform up-and-down parallel motion.

The substrate position controller 48 shown in FIG. 10 includes a table 79 to mount the mother substrate 38a, and a θ-motor 81 to allow the table 79 to rotate in a plane as shown by the arrow θ in FIG. 11. The main scanning drive device 49 shown in FIG. 10 includes a guide rail 82 extending in the main scanning direction X, and a slider 83 integrating a pulse drive linear motor as shown in FIG. 11. The slider 83 moves parallel to the main scanning direction along the guide rail 82 by operating the integrated linear motor.

The sub-scanning drive unit 51 shown in FIG. 10 includes a guide rail 84 extending in the sub-scanning direction Y, and a slider 86 integrating a pulse drive linear motor as shown in FIG. 11. The slider 86 moves parallel to the sub-scanning direction along the guide rail 84 by operating the integrated linear motor.

The pulse drive linear motor in the slider 83 or the slider 86 is able to precisely control the rotation angle of the output axis by pulse signals supplied to the motor. Consequently, the position of the head 52 supported by the slider 83 in the main scanning direction X, and the position of the table 79 in the sub-scanning direction Y can be controlled with high precision. However, positional control of the head 52 and table 79 is not restricted to positional control using the pulse motor, and other control methods, such as feedback control using a servo-motor, may be practically used.

The substrate feeder 53 shown in FIG. 10 includes a substrate housing member 87 to house the mother substrate 38a, and a robot 88 to convey the mother substrate 38a. The robot 88 includes a base 89 to place on the floor or ground, an elevation axis 91 to ascend and descend motions relative to the base 89, a first arm 92 rotating around the elevation axis 91 as a center, a second arm 93 rotating relative to the first arm 92, and an adsorption pad 94 provided at the bottom face of the tip of the second arm 93. The adsorption pad 94 is able to adsorb the mother substrate 38a by air suction.

A capping device 106 and cleaning device 107 are located under the track of the ink-jet head 52 driven by the main-scanning driving device 49 and at one side of the sub-scanning drive unit 51, as shown in FIG. 10. An electronic balance 108 is placed at the other side of the sub-scanning drive device. The cleaning device 107 is provided to clean the ink-jet head 52. The electronic balance 108 weighs the droplets of the ink discharged from each nozzle 57 in the ink-jet head 52 for every nozzle. The capping device 106 is provided to prevent the nozzle 57 from being dried when the ink-jet head 52 is in waiting.

A head camera 111 is placed in the vicinity of the head 52 to permit the camera to integrally move with the head 52. A substrate camera 112 supported by a supporting device (not shown) provided on the base 39 is disposed at a position capable of photographing the mother substrate 38a.

Figure 15:
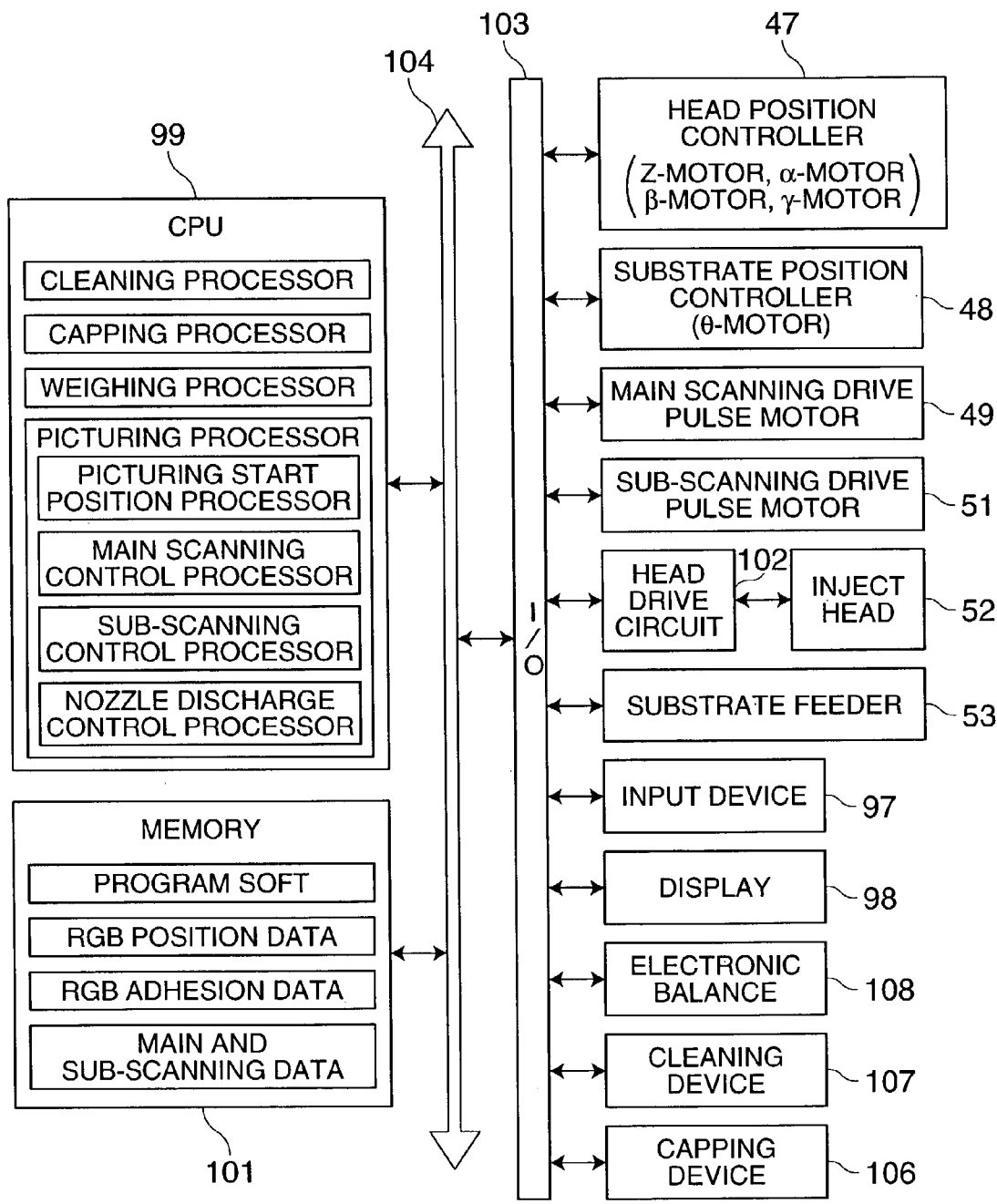
FIG. 15 is a schematic showing the electric control system to be used in the ink-jet apparatus in FIG. 10.

The controller 54 shown in FIG. 10 includes a computer unit 96 housing a processor, a key board 97 as an input device, and a CRT (Cathode Ray Tube) display 98 as a display device. As shown in FIG. 15, the processor includes a CPU (central Processing Unit) 99 to provide data processing and an information storage medium 101 to store information.

Figure 14:
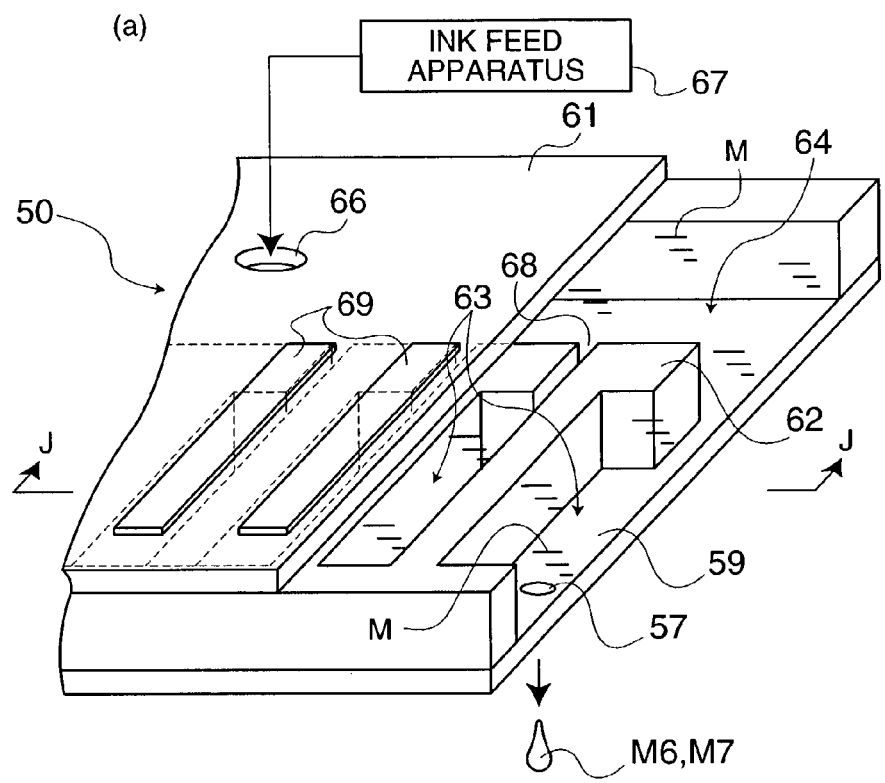
FIGS. 14(a) and 14(b) are schematics that show an inner structure of the head unit of the head, where
Figure 14:
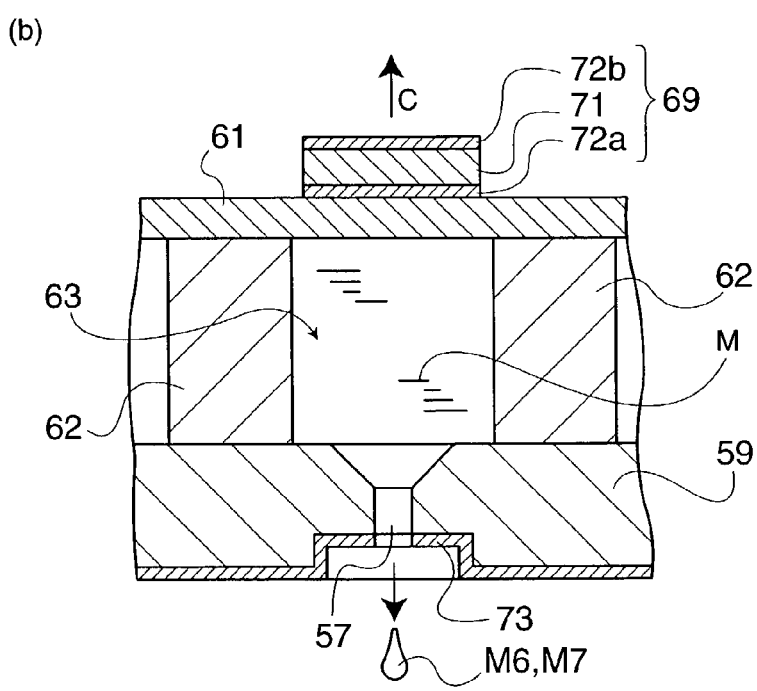
Figure 17:
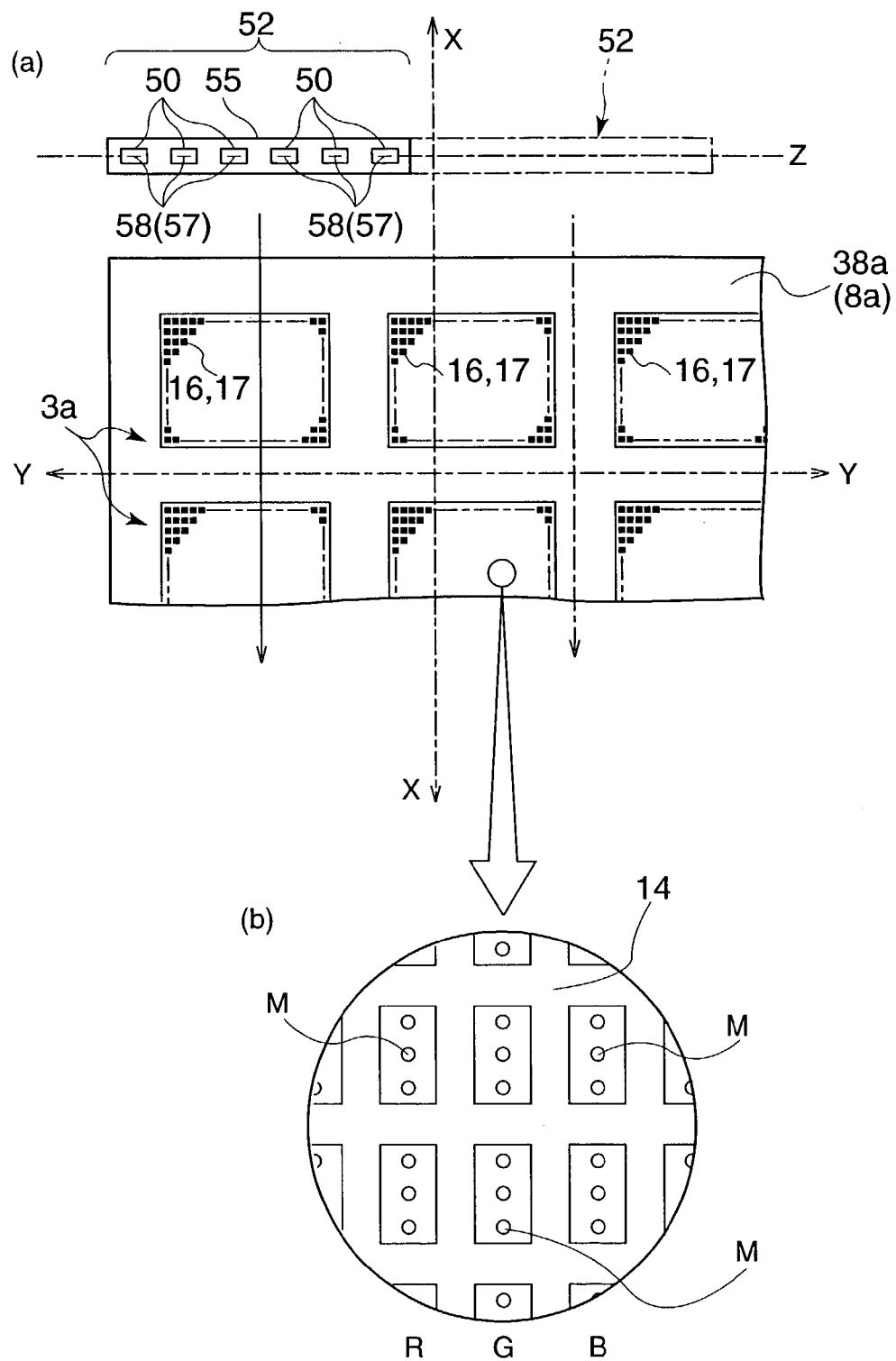
FIGS. 17(a) and 17(b) are plan views schematically showing significant manufacturing steps of one embodiment to form the color filter as principal steps of the method for manufacturing the liquid crystal device according to the present invention.

The head position controller 47, substrate position controller 48, main-scanning driving device 49, sub-scanning drive unit 51 and head driving circuit 102 to drive the piezoelectric element 71 (see FIG. 14(*b*)) in the head 52 shown in FIG. 10 are connected to the CPU 99 via an interface 103 and a bus 104 in FIG. 17.

The substrate feeder 53, input device 97, display 98, electronic balance 108, cleaning device 107 and capping device 106 are also connected to the CPU 99 via the interface 103 and bus 104.

The memory 101 is a conceptual device including a semiconductor memory, such as RAM (Random Access Memory) or ROM (Read Only Memory), and an external memory device such as hard disk, CR-ROM read device and disk type memory device. The function thereof includes a memory region to store a program soft describing control procedures of the operation of the ink-jet apparatus 46, a memory region to store the main scanning travel length of the slider 83 in the main scanning direction X shown in FIG. 11, and the sub-scanning travel length of the mother substrate 38*a* in the sub-scanning direction Y, a region functioning as a work area and temporary file for the CPU 99, and other memory regions.

The ink-jet apparatus 46 is used in the method for manufacturing the liquid crystal device in this embodiment, particularly in both the reflection layer forming step P32 and color pixel forming step P33 in the color filter manufacturing device shown in FIG. 11. The ink-jet apparatus 46 used in these steps have almost the same mechanism with each other.

Figure 4:
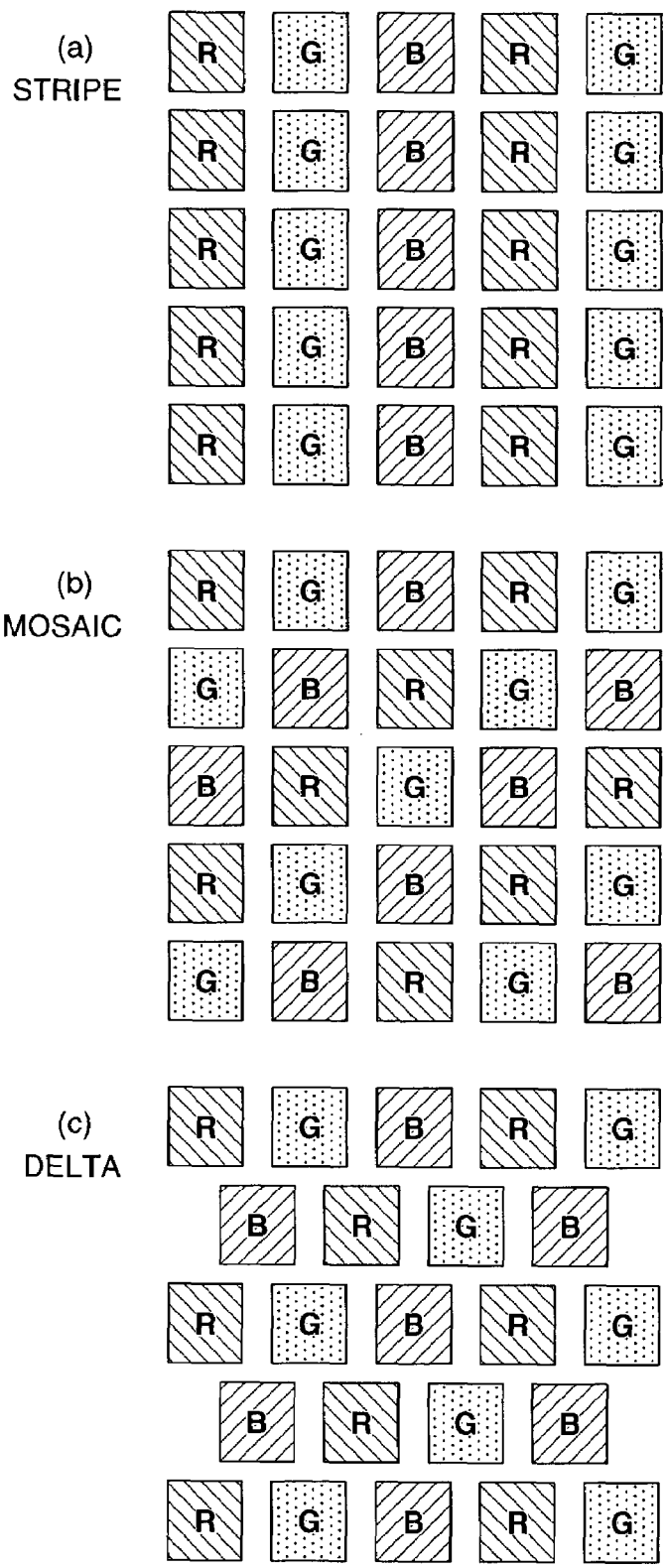
FIGS. 4(a) to 4(c) are schematics that show arrangement of several color pigments in the color filter.

A program soft regulating the overall procedure for forming the color pixel, positional data for forming the R, G and B pixels for realizing a desirable arrangement of the color pixels in FIG. 4, and data on the amount of adhesion of R, G and B color inks prescribing where and how many amount of each color material is to be supplied to the R, G and B position are stored in the memory 101 provided in the ink-jet apparatus 46 to be used in the color pixel forming step P33 shown in FIG. 15. The data on the amount of adhesion of the R, G and B color materials may be prescribed for each color, or may be prescribed in relation to positional coordinates on the mother substrate 38*a*.

The CPU 99 related to the ink-jet apparatus 46 to form the color pixels calculates which ink, or which color pixel material, is to be discharged from which nozzle of the plural nozzles 57 at which timing, based on the positional data for forming the R, G and B pixels and on the data of the amount of adhesion of the R, G and B inks during the main scanning step in the head 52.

A program soft regulating the overall procedure for forming the reflection layer, positional data to form the R, G and B pixels to realize a desirable arrangement of the color pixels in FIG. 4, and data on the amount of adhesion of R, G and B color inks prescribing where and how many amount of each color material is to be supplied to the R, G and B positions are stored in the memory 101 provided in the ink-jet apparatus 46 to be used in the reflection layer forming step P32 shown in FIG. 15, as in the ink-jet apparatus 46 used in the color pixel forming step P33.

The CPU 99 in FIG. 15 controls discharge of the ink, or the reflection layer forming material or color pixel material, on the surface of the mother substrate 38*a* in accordance with the program soft stored in the memory 101. The practical functional part includes a cleaning processor to realize the cleaning process, a capping processor to realize the capping process, a weighing processor to realize weighing using the electronic balance 108 (see FIG. 10), and a picturing processor to realize picturing of the color material or protective layer material using the ink-jet.

The picturing processor comprises, when divided in detail, various functional processors, such as a picture initiation position processor to set the head 52 to an initial picture position, a main scanning control processor to control scanning of the head 52 in the main scanning direction X with a prescribed speed, a sub-scanning control processor to allow the mother substrate 38*a* to shift by a prescribed sub-scanning distance in the sub-scanning direction Y, and a nozzle discharge control processor to control which of the nozzle of the plural nozzles 57 in the head 52 is to be operated at which timing to discharge the ink, or the reflection layer forming material or color pixel material.

While the functions described above were realized based on the software using the CPU 99 in this embodiment, electronic circuits may be used when the functions can be realized using respective electronic circuits without using the software.

The operation of the ink-jet apparatus 46 is described below with reference to the flowchart in FIG. 16.

An initial setting is executed in step S1 when an operator operates the ink-jet apparatus 46 by turning the power source on. Actually, the head-unit 56, substrate feeder 53 and controller 54 are set in prescribed initial states.

Subsequently, the head unit 56 in FIG. 11 is allowed to move to the position of the electronic balance 108 by the main scanning drive device 49 (step S3) when the timing of weighing is ready (YES in step S2), and the ink discharged from the nozzle 57 is weighed using the electronic device 108 (step S4). Then, the voltage applied to the piezoelectric element 71 corresponding each nozzle 57 is adjusted so as to match ink discharge characteristics of the nozzle 57 (step S5).

Subsequently, the head unit 56 is allowed to move to the position of the cleaning device 107 by the main scanning drive device 49 (step S7) at the timing of cleaning is ready (YES in step S6), and the ink jet head 52 is cleaned by the cleaning device 107 (step S8).

When the timing of weighing or cleaning is not ready (NO in S2 and S6) or when the process is over, the substrate feeder 53 in FIG. 10 is operated in step S9 to feed the mother substrate 38*a* to the table 79. Actually, the mother substrate 38*a* in the substrate housing unit 87 is held by adsorbing with the adsorption pad 94, the mother substrate 38*a* is conveyed to the table 79 by moving the elevation axis 91, first arm 92 and second arm 93, and the mother substrate is pressed on a positioning pin 80 (see FIG. 11) provided in advance at an appropriate site on the table 79. For preventing displacement of the mother substrate 38*a* on the table 79, it is desirable to secure the mother substrate 38 on the table 79 by means of air suction and the like.

The mother substrate 38*a* is positioned by permitting the table 79 to rotate in the plane in a minute angle unit by allowing the θ-motor 81 in FIG. 11 to rotate in a minute angle unit while observing the mother substrate 38*a* with the substrate camera 112 in FIG. 10 (step S10). Subsequently, the position to start picturing of the head 52 is determined by calculation while observing the mother substrate 38*a* with the head camera 111 in FIG. 10 (step S11), followed by moving the head 52 to the picturing start position by appropriately allowing the main scanning drive device 49 and sub-scanning drive unit 51 to operate (step S12). The head 52 is adjusted so that the elongation direction Z of the nozzle array 58 of the head unit 50 is perpendicular to the main scanning direction X.

Figure 16:
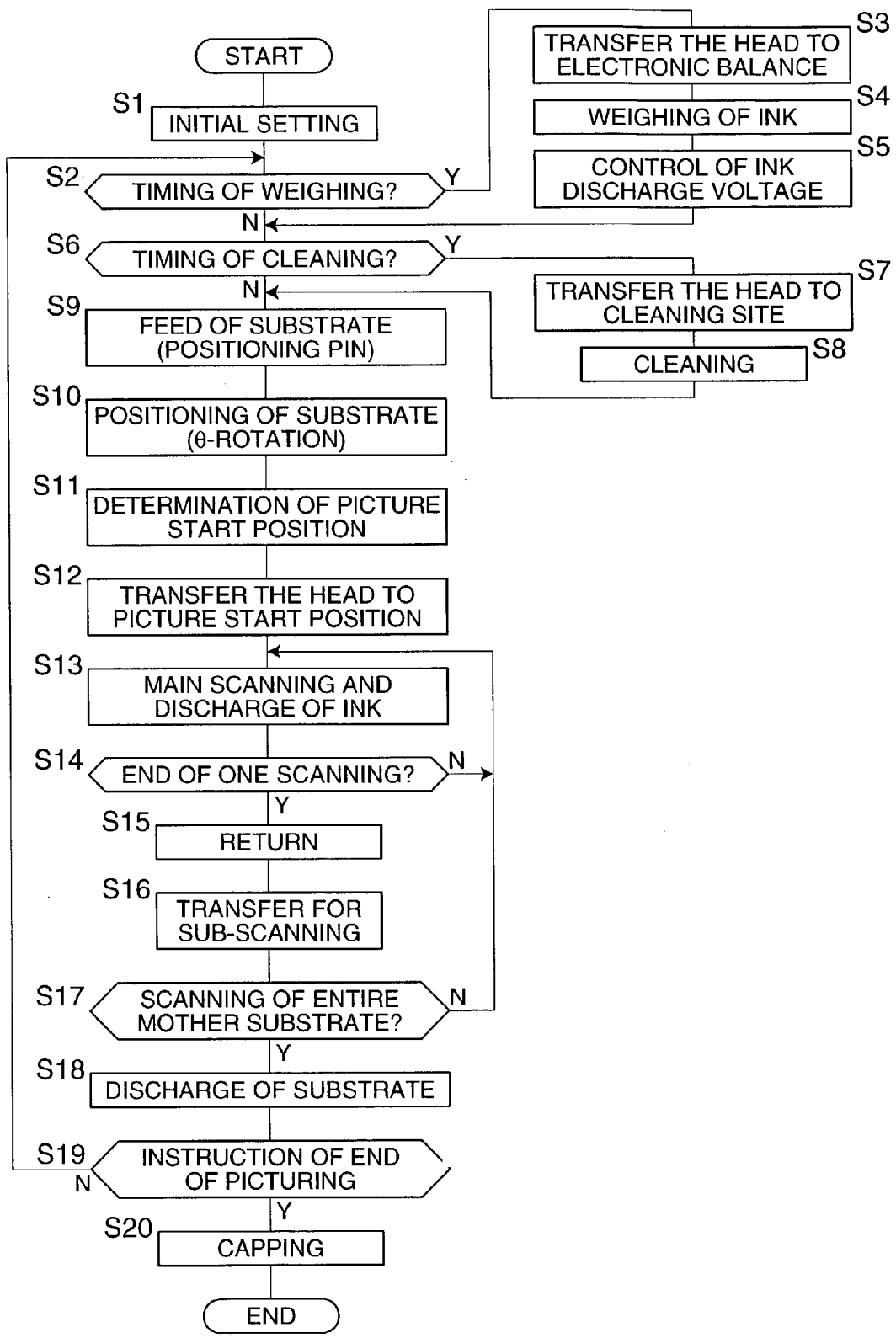
FIG. 16 is a flowchart showing the flow of control executed by the control system in FIG. 15.

When the head 52 is placed at the picture start position in step S12 in FIG. 16, main scanning starts in the X direction in Step S13 thereafter with simultaneous discharge of the ink. Actually, the ink jet-head 52 is linearly moved for main scanning in the main scanning direction X in FIG. 17 with a constant speed. When the nozzle 57 has reached the region where the light reflection material or color pixel material is to be discharged during the movement, the ink, or the reflection layer material or color pixel material, is discharged from the nozzle 57 to fill the region. FIG. 17(b) is a schematic of when the reflection layer material M or the color pixel material M is discharged as droplets, or ad dots, in the region to be divided by the bank 14.

In FIG. 17(a), when the head 52 has completed one time of main scanning to the mother substrate 38a (YES in step S14), the direction of movement of the ink-jet head 52 is reversed and the ink-jet head returns to its initial position (step S15). Furthermore, the head 52 also moves by a predetermined length of sub-scanning in the sub-scanning direction Y, for example by a length corresponding to the length of one array of the nozzle array 58 belonging to one head unit 50, or by a length of an integer fold of the length (step S16), by being driven by the sub-scanning drive unit 51. Subsequently, main scanning and ink discharge are repeated until the reflection layer 16 or color pixel 17 is formed in the region where the color pixel 17 and protective layer 9 have not been formed yet (step S13).

It may be possible to start the sub-scanning movement immediately after completing one main scanning by omitting the reverse movement in step S15. Main scanning may be executed in the inverse direction to the forgoing main scanning after completing the sub-scanning movement, and the ink, or the reflection layer material or color pixel material, may be discharged during main scanning. In other words, main scanning is executed to discharge the ink in both forward and backward movements of the ink-jet head 52.

When the picturing work of the reflection layer 16 or color pixel 17 by the head as described above have been completed in the entire region of the mother substrate 38a (YES in step S17), the mother substrate 38a after processing is discharged by the substrate feeder 53 or other conveyers at step S18. The process returns to step S2 to repeat discharge and adhesion of the color pixel and the like to another mother substrate 38a, unless the operator instructs the end of the processing (NO in step S19).

When an instruction of the end of the work is given by the operator (YES in step S19), the head 52 is conveyed to the capping device 106 in FIG. 10 in accordance with the instruction from the CPU 99, and the head 52 is capped by the capping device 106 (step S20). Patterning of each reflection layer 16 constituting the color filter 11, or patterning of the color pixel 17 is completed by the steps as described above. The step for forming the first electrode that has been described in the step P3 shown in FIG. 7 is executed thereafter.

According to the method for manufacturing the liquid crystal device in this embodiment as described above, each light reflection film 16 is formed by the ink-jet method as shown in FIG. 9. Consequently, the thickness of the reflection layer 16 may be changed in the divided region, and a high transmission region with a light transmittance of 50% or more and a high reflection region with a transmittance of less than 50% may be formed in one divided region. In addition, the relation between the high transmission region 18 of the reflection layer and color pixel 17 may be individually controlled by forming the color pixel 17 by the ink-jet method. Therefore, color display may be precisely controlled for every color pixel 17, thereby enabling color display to be uniform in the plane.

Figure 12:
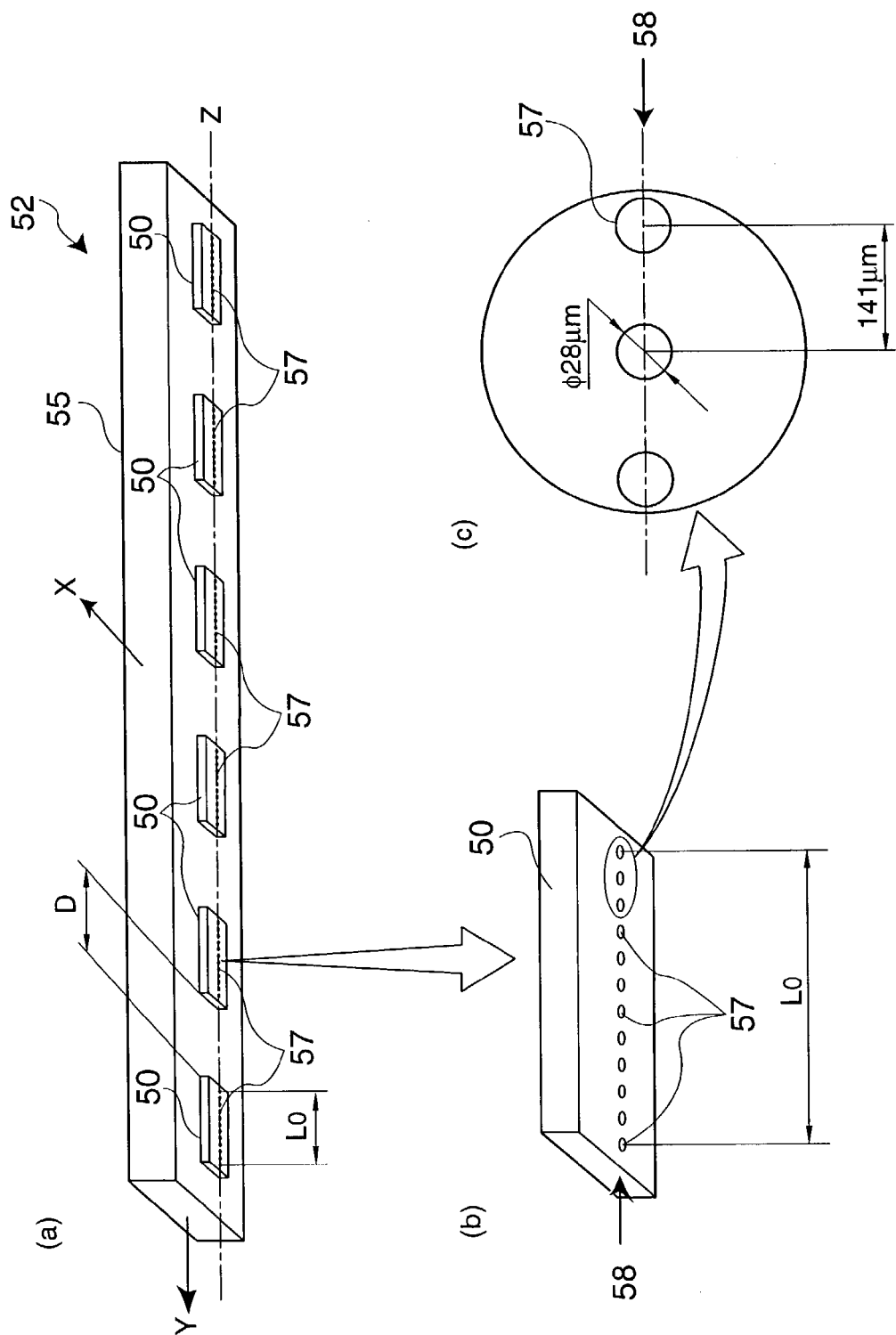
FIGS. 12(a)-12(c) are perspective views showing one embodiment of the head to be used in the device shown in FIG. 10, and one embodiment of a head unit to be used in the ink-jet head.
Figure 13:
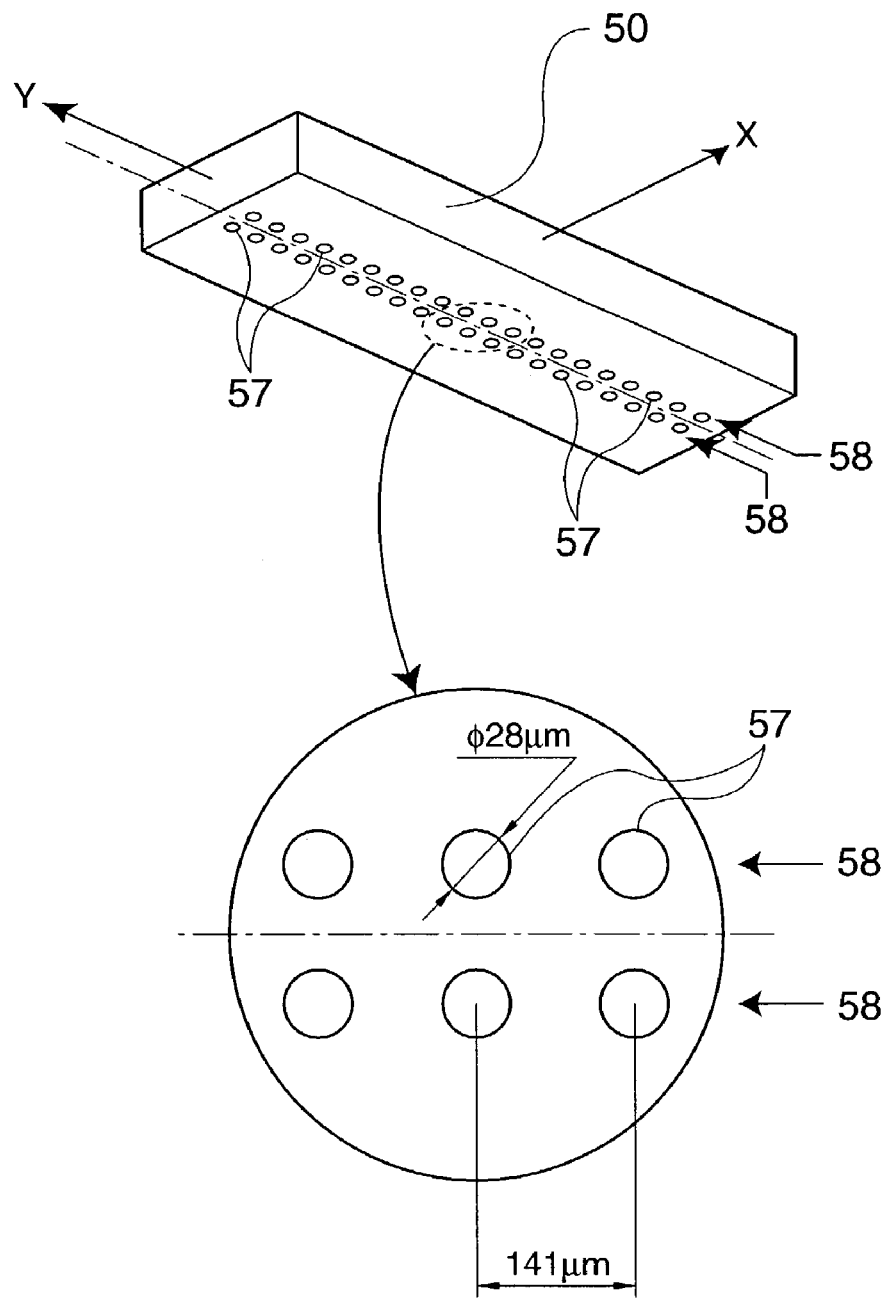
FIG. 13 is a perspective view and schematic showing a modification of the head unit of the head.

FIG. 13 shows an example to modify the head unit 50 shown in FIG. 12(b). While only one nozzle array 58 was provided in the main scanning direction X in the head unit 50 shown in FIG. 12(b), the head unit 50 shown in FIG. 13 includes a plurality of the nozzle arrays 58, two arrays in this embodiment, in the main scanning direction X in place of the head unit. The ink can be discharged from the two arrays of the nozzles 57 aligned in the main scanning direction X when the carriage 55 as shown in FIG. 12(a) moves to scan in the X-direction, and various methods to control the amount of discharge of the reflection layer material and color pixel material may be employed.

Figure 18:
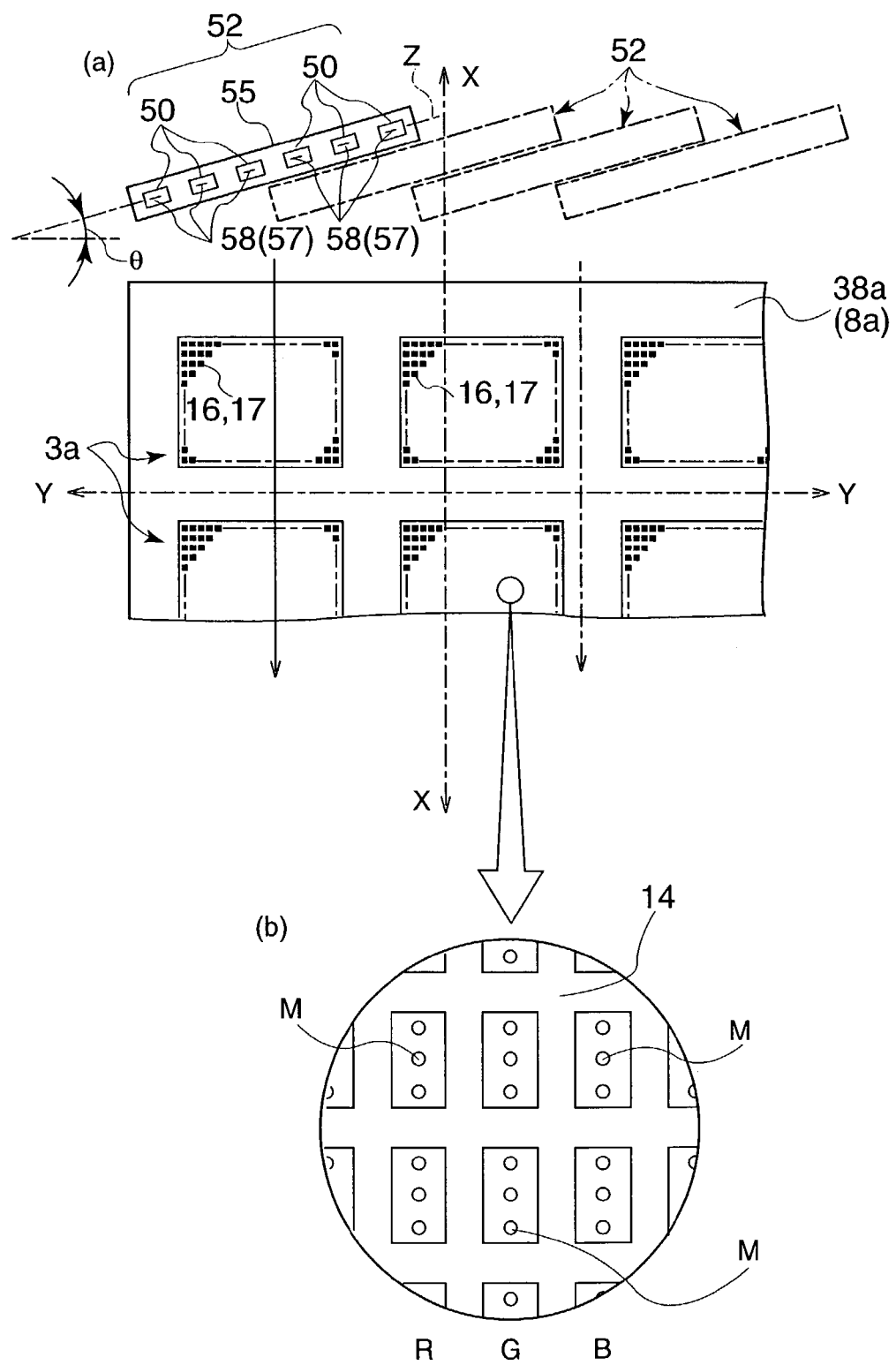
FIGS. 18(a) and 18(b) are plan views schematically showing significant manufacturing steps of another embodiment for forming the color filter as principal steps of the method for manufacturing the liquid crystal device according to the present invention.

FIG. 18 shows the method for manufacturing the liquid crystal device according to the present invention, particularly significant steps of other embodiments of the step for forming the color filter. These steps may be employed in place of the steps shown in FIG. 17 in the foregoing embodiment. The color filter manufactured by the manufacturing method according to this embodiment may be the color filter indicated by the reference numeral 11 in FIGS. 5(a)-5(c). The color filter 11 may include a plurality of the liquid crystal panels simultaneously formed on the mother filter substrate 38a shown in FIG. 8(a).

The color pixels formed in the color filter 11 may be variously aligned, such as the striped arrangement shown in FIG. 4. The steps shown by steps P31 to P34 shown in FIG. 9 may be employed in the steps for forming the color filter 11. The device having the structure as shown in FIG. 10 may be employed as the ink-jet apparatus used in the step P32 for forming the reflection layer and in the step P33 for forming the color pixel.

The embodiment shown in FIG. 18 differs from the foregoing embodiment in that, as will be apparent in comparison with FIG. 17, the entire carriage 55 is tilted with an angle θ to the sub-scanning direction Y when the head 52 is placed at an initial position against the substrate 38a, or at the main scanning start position. Consequently, the elongation direction Z of six nozzles 58 is tilted with the angle θ to the sub-scanning direction Y.

According to the construction of this embodiment, each head unit 50 performs main scanning in the X-direction with an angle θ tilted to the sub-scanning direction Y. As a result, the nozzle pitch between the plural nozzles 57 belonging to each head unit 50 may be matched with the distances between the reflection layer forming regions and between the color pixel forming regions, or with the pitch between the elements, on the mother substrate 38a. Allowing the pitch between the nozzles and the pitches between the elements to geometrically match with each other is advantageous since no positional control with respect to the sub-scanning direction Y of the nozzle array 58 is required.

Figure 19:
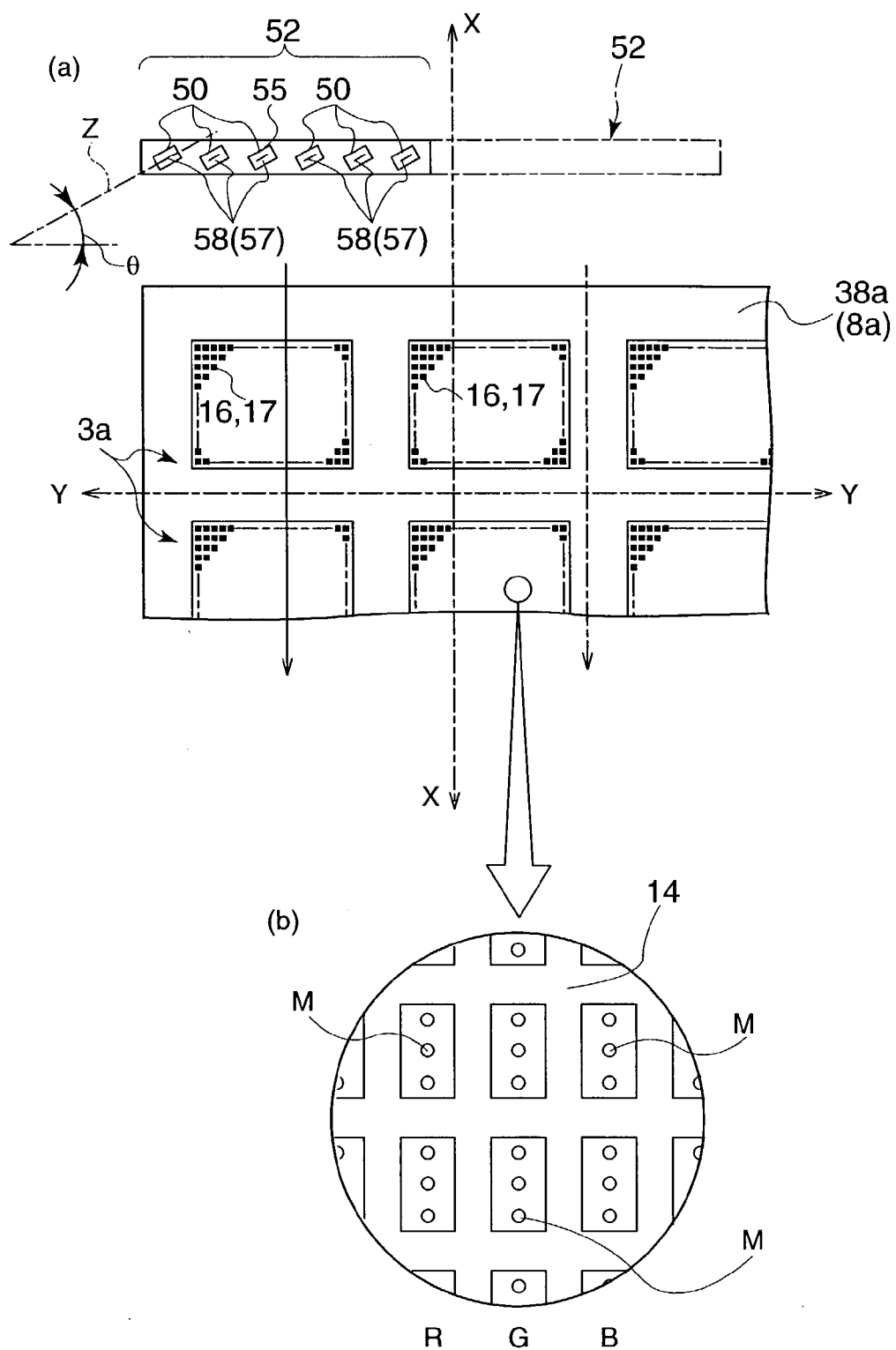
FIGS. 19(a) and 19(b) are plan views schematically showing significant manufacturing steps of a further different embodiment to form the color filter as principal steps of the method for manufacturing the liquid crystal device according to the present invention.

FIG. 19 shows the method for manufacturing the liquid crystal device according to the present invention, particularly significant steps of a further different embodiment of the steps for forming the color filter. This steps may be employed in place of the steps shown in FIG. 17 in the foregoing steps that have been already described. The color filter manufactured by the manufacturing method according to this embodiment may be the color filter indicated by the reference numeral 11 in FIGS. 5(a)-5(c). The color filter 11 may include a plurality of the liquid crystal panels simultaneously formed on the mother substrate 38a shown in FIG. 8(a).

The color pixels formed in the color filter 11 may be variously aligned, such as the striped arrangement shown in FIG. 4. The steps shown by steps P31 to P34 shown in FIG. 9 may be employed in the steps for forming the color filter 11. The device having the structure as shown in FIG. 10 may be employed as the ink-jet apparatus used in the step P32 for forming the reflection layer and in the step P33 for forming the color pixel.

The embodiment shown in FIG. 19 differs from the foregoing embodiment in that, as is apparent in comparison with FIG. 17, while the entire carriage 55 is not inclined against the sub-scanning direction Y when the head 52 is placed at the initial position on the mother substrate 38a, or at the main scanning starting position, the elongation direction Z of each nozzle array 58 is inclined by an angle θ to the sub-scanning direction Y by allowing each head unit 50 of six head units 50 to incline by the angle θ to the sub-scanning direction Y.

Each nozzle array 58 performs main scanning with the angle θ inclined to the sub-scanning direction Y in the construction of this embodiment. Consequently, the pitch between the nozzles of the plural nozzles 57 belonging to each nozzle array 58 may be equal to the distance between the reflection layer forming regions 38a and the distance between the color pixel forming regions on the mother substrate 38a, or to the pitch between the elements. It is advantageous to allow the pitch between the nozzles to geometrically match the pitch between the elements for eliminating the need of positional control of the nozzle array 58 in the sub-scanning direction Y. The carriage 55 is not entirely inclined in this embodiment as is done in FIG. 18, and instead the head units 50 are individually inclined. Therefore, the distance from the most distal nozzle 57 to the most proximal nozzle 57 in relation to the mother substrate 38a as a discharge object becomes smaller as compared the corresponding distance in FIG. 18. This results in reduction of the time needed for main scanning in the X-direction, or reduction of the time needed to manufacture the color filter substrate.

Second Embodiment of Liquid Crystal Device

In the embodiment shown in FIGS. 5(a)-6(b), the reflection layer 16 was formed to have a cross-section swelled at the center, or as a dome, in the region surrounded by the bank 14. This shape can be formed by slowly drying the reflection layer material dripped by the ink-jet method at a low temperature, for example at 40° C. for about 10 minutes.

Figure 20:
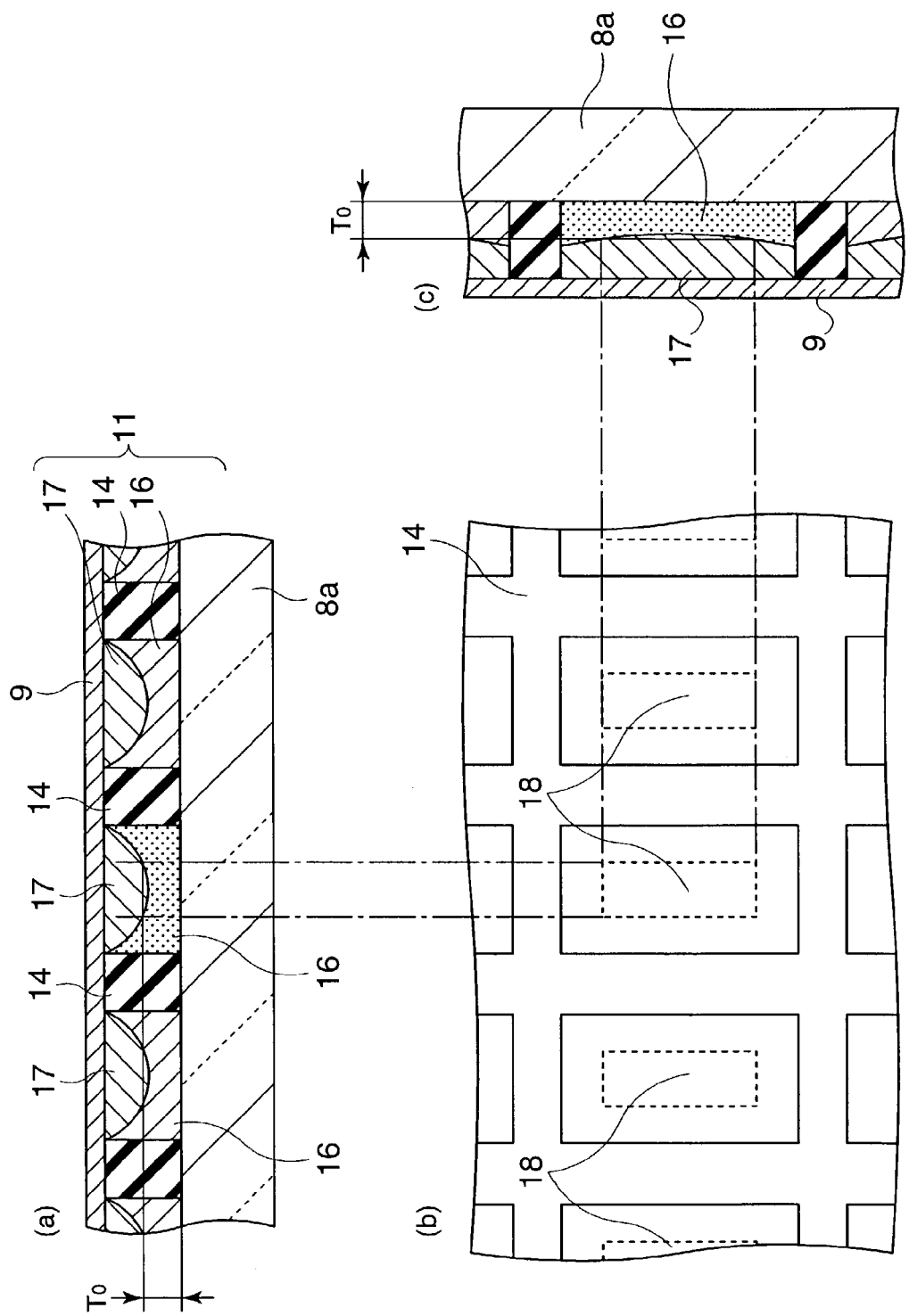
FIGS. 20(a) to 20(c) are schematics that show the structure of one pixel unit in another embodiment of the color filter, where

It is also possible to form the reflection layer 1 to have a cross-sectional depressed at the center, or as a trough, as shown in FIG. 20 in place of the reflection film 16 with the shape as shown in FIG. 16. This shape may be formed by rapidly drying the reflection layer material dripped by the ink-jet method at a high temperature, for example at 100° C. for about 1 minute. Temperature control for such a high temperature drying process is simpler as compared with the low temperature drying process, since a relatively wide range of temperature error is permissible in addition to rather short time for completing the process.

The high transmission region 18 on the reflection layer 9 may be provided at the center of the region surrounded by the bank 14 as shown in FIG. 20, or only at the portion where the thickness of the reflection layer 16 is small, when the reflection layer 16 is formed to have a trough-shape cross-section. As a result, the optical length in the reflection mode display may become substantially equal or equal to the optical length in the transmission mode display for passing through the reflection layer 16, thereby enabling the displayed color to be uniform between the two color display mode.

The high transmission region of the reflection layer may be also determined with reference to the interference pattern caused by the difference of the thickness on the reflection layer 16 in this embodiment as in the embodiment shown in FIG. 6(b). The same reference numerals are given to the same members as in the embodiment shown in FIGS. 5(a)-5(c), and descriptions of these members are omitted in FIG. 20.

Embodiment of Electronic Appliances

Figure 21:
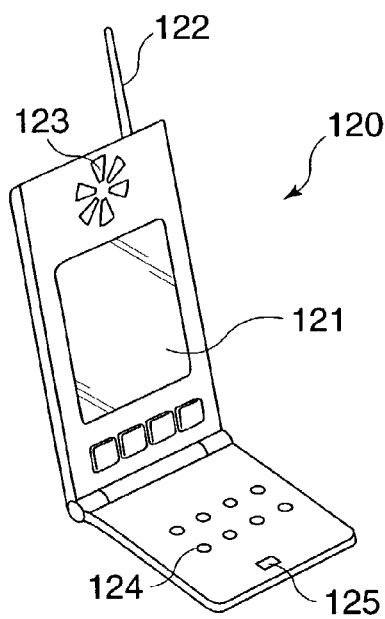
FIG. 21 is a perspective view of one embodiment of an electronic appliance according to the present invention.

FIG. 21 shows an embodiment of a cellular phone as one examples of the electronic appliances according to the present invention. The cellular phone 120 includes a display member 121 including the liquid crystal device, an antenna 122, a speaker 123, a key assembly 124 and a microphone 125. The liquid crystal device as the display member may be constructed using, for example, the liquid crystal 1 shown in FIG. 1.

Figure 22:
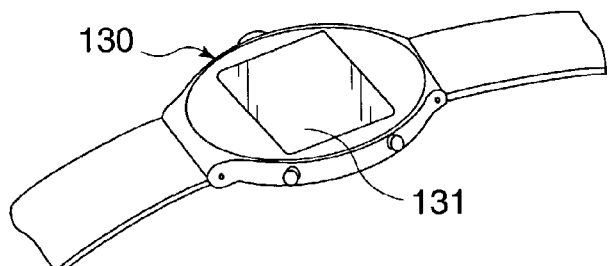
FIG. 22 is another perspective view of one embodiment of another electronic appliance according to the present invention.

FIG. 22 shows an embodiment of a watch as one example of an electronic appliance according to the present invention. The liquid crystal 131 is used for the display member of the watch 130, and the liquid crystal device 131 may be constructed using the liquid crystal 1 shown in FIG. 1.

Figure 23:
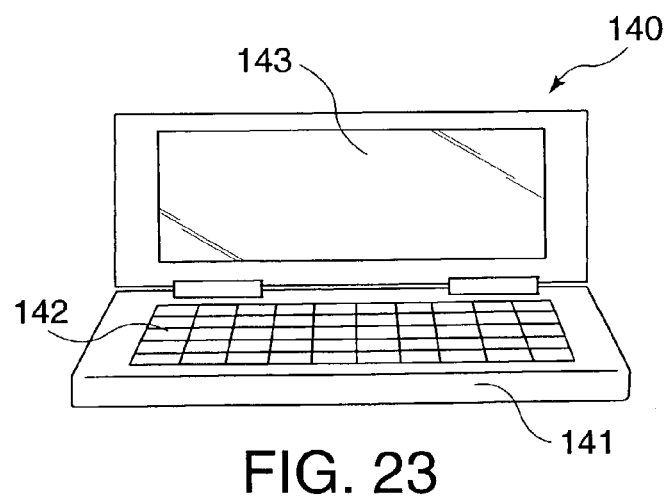
FIG. 23 is a perspective view of a further different embodiment of another electronic appliance according to the present invention.

FIG. 23 shows an embodiment of a portable type information processor as one example of an electronic appliance according to the present invention. The portable type information processor 140 is provided, for example, as a word processor and personal computer. The portable type information processor 140 includes an input device 142 such as a keyboard provided on the surface of the main unit 141, and the liquid crystal device 143 as a display member. Through processing by the processor provided within the main unit 141, information input through the keyboard 142, and the results of processing based on this information are displayed on the display member 143.

Other Preferable Embodiment

While the present invention have been described with reference to some of the preferable embodiments, various modifications are possible within the scope of the claims of the present invention with no restrictions by the embodiments as set forth above.

For example, the present invention is not restricted to the use of R, G and B color pixels; and C (cyan), M (magenta) and Y (yellow) color pixels may be used in place of the R, G and B color pixels.

While the impinged external light was directly reflected by the crystal layer in the reflection mode display in the foregoing embodiments, scattering angles of the reflected light may be controlled by forming a light scattering layer, if necessary.

While six head units 50 were provided in the ink-jet head 52 as shown in FIG. 12 in the embodiment described above, the number of the head units 50 may be increased or decreased.

While plural arrays of the liquid crystal panel forming region 3a and 3b are formed on the mother substrate 38a and 38b, respectively, in the embodiments shown in FIGS. 8(a) and 8(b), the present invention is applicable to the embodiment in which one array of the liquid crystal panel forming region 3a is provided in the mother substrates 38a and 38b. The present invention is also applicable when one liquid crystal panel forming region 3a or 3b having a size approximately the same or smaller than the size of the mother substrate 38a or 38b is formed in the mother substrate 38a or 38b.

In the ink-jet apparatus 46 shown in FIGS. 10 and 11, the substrate 38a was subjected to main scanning by allowing the ink-jet head 52 to move in the X-direction, and the substrate 38a was subjected to sub-scanning with the head 52 by allowing the substrate 38a to move by the sub-scanning drive unit 51. However, main scanning may be performed by the movement of the substrate 38a in the Y-direction, and sub-scanning may be performed by the movement of the head 52 in the X-direction.

While the ink was discharged from the head by taking advantage of distortion of the piezoelectric element, a head having other arbitrary structure may be used.

Not only the ink-jet method but also other various methods, such as the spin-coat method, roll coat method and printing method, may be used to form the protective layer.

According to the liquid crystal device and method for manufacturing the liquid crystal device of the present invention as described above, the portion of the color pixel having a maximum thickness is formed corresponding to the region of the reflection layer having a transmittance of 50% or more, or corresponding to the high transmittance region, the high transmission region of the reflection layer is formed at the center of the pixel, or the high transmittance region of the reflection layer is formed as a ring along the periphery of the color pixel. Accordingly, the color is uniformly displayed with no irregularity in the transmission mode display while permitting the color display to be even between the transmission mode display and reflection mode display.

What is claimed is:

1. A display substrate, comprising:
   a pair of electrodes facing each other;
   a dot formed in each region in which said pair of the electrodes are facing;
   a reflection layer disposed corresponding to the dot, an entirety of the reflection layer having a non-uniform reflectivity in a high transmittance region, said region having a transmittance of 50% or more, and a non-uniform reflectivity in a high reflectivity region, said region having a reflectivity of 50% or more, in each dot; and
   a color pixel disposed corresponding to each dot formed on the reflection layer.

2. The display substrate according to claim 1, further including color pixels disposed corresponding to each dot, a transmittance of each color pixel being not uniform in the dot.

3. The display substrate according to claim 1, further including color pixels disposed corresponding to each dot, a thickness of each color pixel being not uniform in the dot.

4. The display substrate according to claim 1, the region having the transmittance of 50% or more accounting for 5% or more and 45% or less of the dot area.

5. The display substrate according to claim 1, the dot being divided by dividing members, and
   one of the regions having transmittance of 50% or more and reflectivity of 50% or more being disposed at one of the portion of either the central portion or peripheral portion of the region divided by the dividing member, and the other region being disposed at the other portion of either the central portion or peripheral portion.

6. A liquid crystal device, comprising: liquid crystal;
   a pair of substrates facing each other, the liquid crystal being disposed between said pair of the substrates, the pair of substrates including the display substrate according to claim 1.

7. A display substrate, comprising:
   a pair of electrodes facing each other;
   a dot formed in each region in which said pair of the electrodes are facing each other;
   a reflection layer disposed corresponding to the dot, an entirety of the reflection layer having a non-uniform reflectivity in a high transmittance region, said region having a transmittance of 50% or more, and a non-uniform reflectivity in a high reflectivity region, said region having a reflectivity of 50% or more, each dot, and a thickness of the reflection layer being not uniform in each dot; and
   a color pixel disposed corresponding to each dot formed on the reflection layer.

* * * * *